United States Patent
Tecott et al.

(10) Patent No.: US 7,086,350 B2
(45) Date of Patent: Aug. 8, 2006

(54) ANIMAL CAGE BEHAVIOR SYSTEM

(75) Inventors: Laurence H. Tecott, San Francisco, CA (US); Evan Goulding, San Francisco, CA (US)

(73) Assignee: The Regents of the University of California, Oakland, CA (US)

(*) Notice: Subject to any disclaimer, the term of this patent is extended or adjusted under 35 U.S.C. 154(b) by 0 days.

(21) Appl. No.: 10/627,187

(22) Filed: Jul. 25, 2003

(65) Prior Publication Data

US 2005/0066910 A1   Mar. 31, 2005

Related U.S. Application Data

(60) Provisional application No. 60/399,043, filed on Jul. 25, 2002.

(51) Int. Cl.
  *A01K 1/03* (2006.01)
(52) U.S. Cl. .................................... 119/421
(58) Field of Classification Search ........... 119/51.02, 119/417, 420, 421
  See application file for complete search history.

(56) References Cited

U.S. PATENT DOCUMENTS 3,540,413 A * 11/1970 Castaigne .................. 119/421
3,974,798 A    8/1976 Meetze, Jr.
4,337,726 A    7/1982 Czekajewski et al.
4,617,876 A * 10/1986 Hayes ..................... 119/842
4,917,117 A    4/1990 Brom et al.
4,969,417 A   11/1990 Sakano
5,163,380 A * 11/1992 Duffy et al. ............. 119/418
5,717,202 A *  2/1998 Matsuda ................. 250/221
6,311,644 B1  11/2001 Pugh
6,418,876 B1 *  7/2002 Hall et al. ............. 119/14.08
6,715,444 B1   4/2004 Yabusaki et al.

OTHER PUBLICATIONS (2004) Medical News Today Article.
(2004) Lafayette Instrument Article.

* cited by examiner

*Primary Examiner*—Robert P. Swiatek
(74) *Attorney, Agent, or Firm*—Quine I.P. Law Group, P.C.; Tom Hunter

(57) ABSTRACT

A behavioral monitoring system useful for the analysis of complex behaviors in a number of animal species. The monitoring systems of this invention allow continuous monitoring of feeding, drinking and movement of animals with high temporal and spatial resolution. In certain embodiments, the system comprises an enclosure comprising: an animal position indicator; a food consumption indicator; and a fluid consumption indicator, where the system reports behavioral data at a temporal resolution of 20 seconds or lower.

26 Claims, 31 Drawing Sheets

Three Consecutive N-N Excursions

First

Second

Third

ANIMAL CAGE BEHAVIOR SYSTEM

CROSS-REFERENCE TO RELATED APPLICATIONS

This application claims priority to and benefit of U.S. Ser. No. 60/399,043, filed on Jul. 25, 2002, which is incorporated herein by reference in its entirety for all purposes.

STATEMENT AS TO RIGHTS TO INVENTIONS MADE UNDER FEDERALLY SPONSORED RESEARCH AND DEVELOPMENT

This invention was made with Government support by Grant Nos: MH61624 and MH01949 awarded by the National Institutes of Health. The Government of the United States of America has certain rights in this invention.

FIELD OF THE INVENTION

This invention pertains to the field of ethology and neurobiology. In particular this invention provides devices and methods to evaluate genetic influences on animal behavior.

BACKGROUND OF THE INVENTION

Substantial limitations currently exist in our ability to apply recent biotechnological advances to analyze neural substrates of complex mammalian behavior. In contrast to the rapid pace of innovation seen in the fields of mammalian genomics, medicinal chemistry and information technology, less progress has been made in the development of behavioral assessment techniques for mice or other mammals. Such procedures are vital for exploring the impact of genes, drugs and environment on brain functions relevant to common neuropsychiatric conditions such as schizophrenia, depression, and anxiety. Standard approaches involving repeated removal of mice from their home cages for a battery of behavioral tests are problematic because: 1) they are time-consuming and labor-intensive, 2) the order of test administration can skew the resulting data, 3) removal of mice from the home cage produces stress that confounds interpretation of behavioral data, and 4) data are frequently misinterpreted due to a failure to consider behavioral domains that are not the main focus of study (eg: impact of anxiety on tests of learning).

For example, the 2-bottle ethanol preference test (often used in behavioral phenotyping in alcohol research) is widely used in genetic screens to provide an indication of the rewarding properties of ethanol. The test is simple to administer, but difficult to interpret; increased preference could either reflect enhanced sensitivity to the rewarding properties of ethanol, or alternatively, a reduction of sensitivity requiring animals to consume more ethanol to achieve similar hedonic effects. Moreover, preference for ethanol-containing solutions can be influenced by factors such as taste, novelty and caloric content, and it is often unclear whether animals achieve blood alcohol levels sufficient to produce pharmacological effects. Studies dependent on isolated behavioral outcome measures such as preference are therefore subject to overinterpretation if they are not placed in the context of the multiple neuropsychological processes that influence behavioral performance.

The problem of reliance on isolated behavioral readouts also pertains to apparently simple measures, as indicated by recent findings that the impact of genetic mutations on ethanol-induced motor impairments are highly dependent on the particular behavioral assays employed. In humans, alcohol abuse, dependence and withdrawal occur in a complex behavioral context and produce global perturbations of behavioral organization, including alterations in sleep and vigilance, motor activity levels and coordination, nutrition, anxiety and mood. Behavioral phenotyping approaches are needed that address the complex behavioral contexts in which alcohol consumption occurs, as well as those behaviors that are in turn influenced by alcohol.

SUMMARY OF THE INVENTION

This invention pertains to a novel behavioral monitoring system useful for the analysis of complex behaviors in a number of animal species. The monitoring systems of this invention allow continuous monitoring of feeding, drinking and movement of animals with high temporal and spatial resolution. The high temporal and spatial resolution the systems of this invention permits the detection, quantification, and categorization of various behavior patterns, and/or components of such patterns and facilitates automated analysis and generation of behavioral fingerprints.

Definitions

The term "lickometer" refers to a device that provides a measure of fluid consumption by an animal.

The term "feeder" refers to a device that provides food to an animal in captivity. In preferred embodiments, the feeder provides a measure of the amount of food consumed by the animal.

The term "database" refers to a means for recording and retrieving information. In preferred embodiments the database also provides means for sorting and/or searching the stored information. The database can comprise any convenient media including, but not limited to, paper systems, card systems, mechanical systems, electronic systems, optical systems, magnetic systems or combinations thereof. Preferred databases include electronic (e.g. computer-based) databases. Computer systems for use in storage and manipulation of databases are well known to those of skill in the art and include, but are not limited to "personal computer systems", mainframe systems, distributed nodes on an inter- or intra-net, data or databases stored in specialized hardware (e.g. in microchips), and the like.

A "behavioral fingerprint" refers to a summary of behavioral components that is characteristic of an animal under certain defined conditions and that can be used to distinguish that animal from another species and/or strain and/or mutant.

An "event file" is a file containing behavioral data where each entry is characterized by an event. This is in contrast to a "continuous recording file". The event file can comprise any medium capable of recording information, e.g., paper, optical media, magnetic media, internet storage, etc. In preferred embodiments, the event file comprises a computer readable medium.

The term "test agent" refers to an agent that is to be screened in one or more of the assays described herein. The agent can be virtually any chemical compound. It can exist as a single isolated compound or can be a member of a chemical (e.g. combinatorial) library. In a certain embodiments, the test agent will be a small organic molecule.

The term "small organic molecule" refers to a molecule of a size comparable to those organic molecules generally used in pharmaceuticals. The term excludes biological macromolecules (e.g., proteins, nucleic acids, etc.). Preferred small organic molecules range in size up to about 5000 Da, more preferably up to 2000 Da, and most preferably up to about 1000 Da.

BRIEF DESCRIPTION OF THE DRAWINGS

FIG. 18A: Total chow consumed per cycle. 2C, Ob, and Ay mice had significant effects of cycle ($p<0.001$; $p<0.001$; $p<0.001$) as well as significant effects of genotype ($p<0.01$; $p<0.01$; $p<0.001$) on the amount of chow consumed when compared to WT mice. 2C mice had a significant cycle by genotype interaction ($p<0.05$). FIG. 18B: Total water consumed per cycle. 2C, Ob, and Ay mice had significant effects of cycle on the amount of water consumed ($p<0.001$; $p<0.001$; $p<0.001$). 2C and Ob mice had significant cycle by genotype interactions ($p<0.01$; $p<0.01$). FIG. 18C: Total movement per cycle. 2C, Ob, and Ay mice had significant effects of cycle ($p<0.001$; $p<0.001$; $p<0.001$), significant effects of genotype ($p<0.01$; $p<0.001$; $p<0.01$) and had significant cycle by genotype interactions ($p<0.03$; $p<0.001$; $p<0.001$) on total movement per cycle. In all figures, values represent mean±SEM, with wild type indicated by grey symbols and mutant indicated by black symbols.

FIG. 22A: Mean cluster size per cycle, measured by amount of food consumed in grams. In the dark cycle, Ob mice had significantly larger cluster sizes ($p<0.01$) than their WT controls. In the dark cycle, Ob and Ay mice had significantly larger cluster sizes ($p<0.001$; $p<0.001$) than their respective WT controls. FIG. 22B: Mean number of clusters per cycle. In the dark cycle, 2C and Ob mice had significantly fewer clusters (p<0.05; p<0.02) than their respective WT controls. In the light cycle, 2C mice had significantly more clusters (p<0.01) and Ob mice had significantly fewer clusters (p<0.01) than their respective WT controls. FIG. 22C: Mean intercluster interval duration per cycle. In the dark cycle, Ob mice had a significantly longer ICI duration (p<0.001) than their WT controls. In the light cycle, 2C mice had significantly shorter ICI durations (p<0.001) and Ob mice had significantly longer ICI durations (p<0.001) than their respective WT controls.

FIG. 24A: The amounts of food eaten in 6 minute intervals for ten days of data were averaged and smoothed, shown in red. FIG. 24B: Periodograms, showing the frequencies of certain periodicities of feeding across time, were calculated from the averaged and smoothed data. The dotted lines show the significances values. The significant peaks were used to generate a waveform, shown in blue applied to the data in (FIG. 24A. WT mice have significant peaks at 24, 12, 8, and 5 hours. Ob mice have significant peaks at 24 and 3 hours.

FIG. 25A: Kullback-Leibler measures of divergence were calculated between periodograms for individual mice and used to cluster based on Ward hierarchical clustering technique. The clustering of periodograms for individual mice shows three qualitative groups, one with mostly WT and 2C mice, one with mostly WT and Ay mice, and one with only Ob mice. FIG. 25B: The averaged periodograms for each group are shown. FIG. 25C: Waveforms generated from each averaged periodogram are shown.

DETAILED DESCRIPTION

I. Behavioral Monitoring System.

This invention pertains to a novel behavioral monitoring system useful for the analysis of complex behaviors in a number of animal species. The monitoring systems of this invention allow continuous monitoring of feeding, drinking and movement of animals with high temporal and spatial resolution. The high temporal and spatial resolution the systems of this invention permits the detection, quantification, and categorization of various behavior patterns, and/or components of such patterns.

The components of the system (e.g. the lickometer, the feeder, etc.) are optimized with a number of features that that minimize or significantly reduce the incidence of erroneous readings. The devices therefore provide an output that is a good measure of actual animal behavior.

Thus, for example, in certain embodiments, the detector in the feeder comprises a photobeam. It was a surprising discovery that small animals (e.g. rats, mice, etc.) tend to pile up food during a feeding activity and this piled up food can block the photobeam, or other detector and produce a false positive reading. Such false positives were reduced/eliminated by engineering the feeder with a trough 16 around the feed bin 42 (see, e.g., FIG. 3). As illustrated by FIGS. 4A and 4B, detector signal (e.g. photobeam breaks) provided a good measure of actual food consumption.

Figure 5:
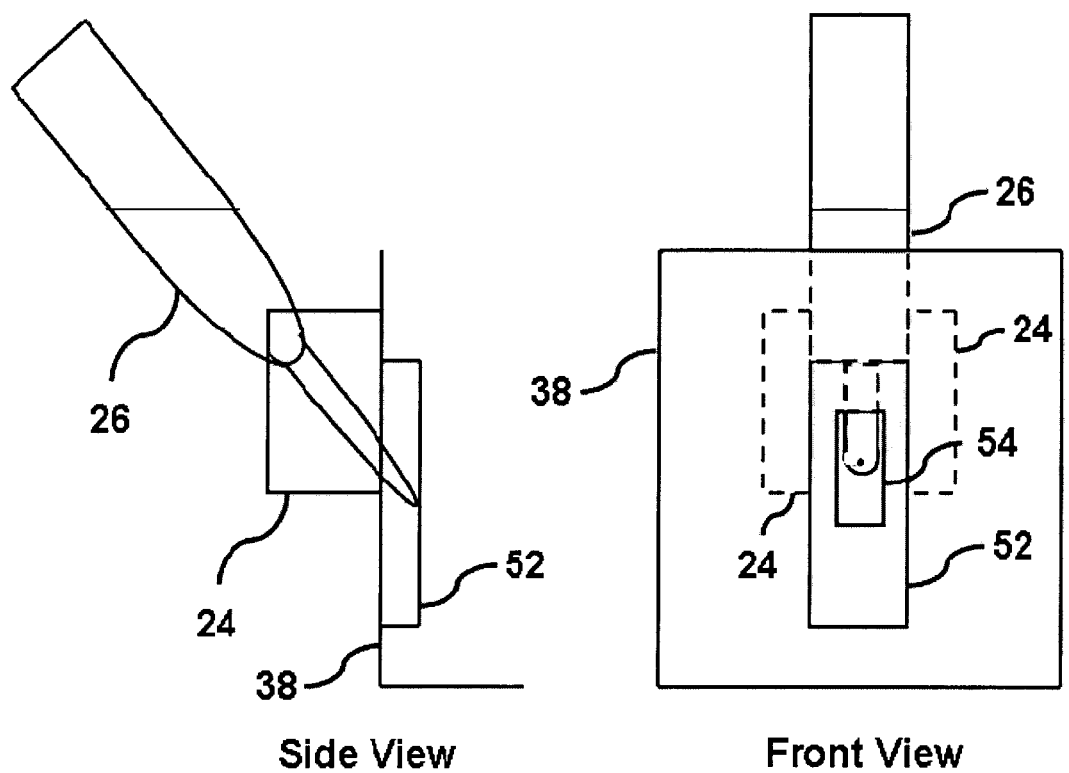
FIG. 5 shows a schematic illustration of the lickometer 32 showing the fluid reservoir 26, the detector 24 (e.g. conductance or capacitance meter), and the barrier plate 52, with slot 54.
Figure 6A:
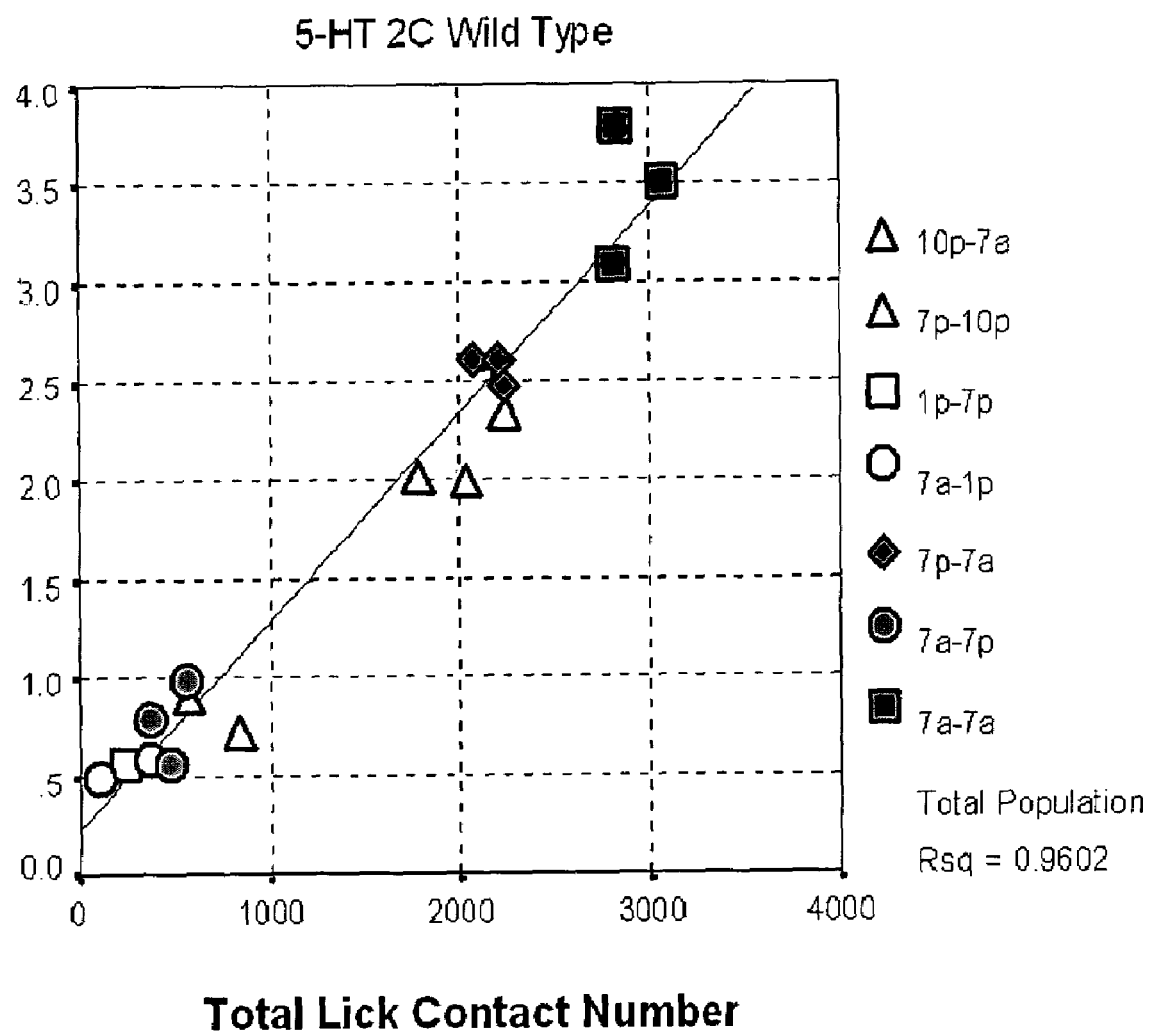
FIGS. 6A and 6B show the correlation of fluid intake with number of licks 5-HT 2C wild type mutant (knockout mice (FIG. 6A), and for 5-HT 2C mutant (knockout mice (FIG. 6B).
Figure 6B:
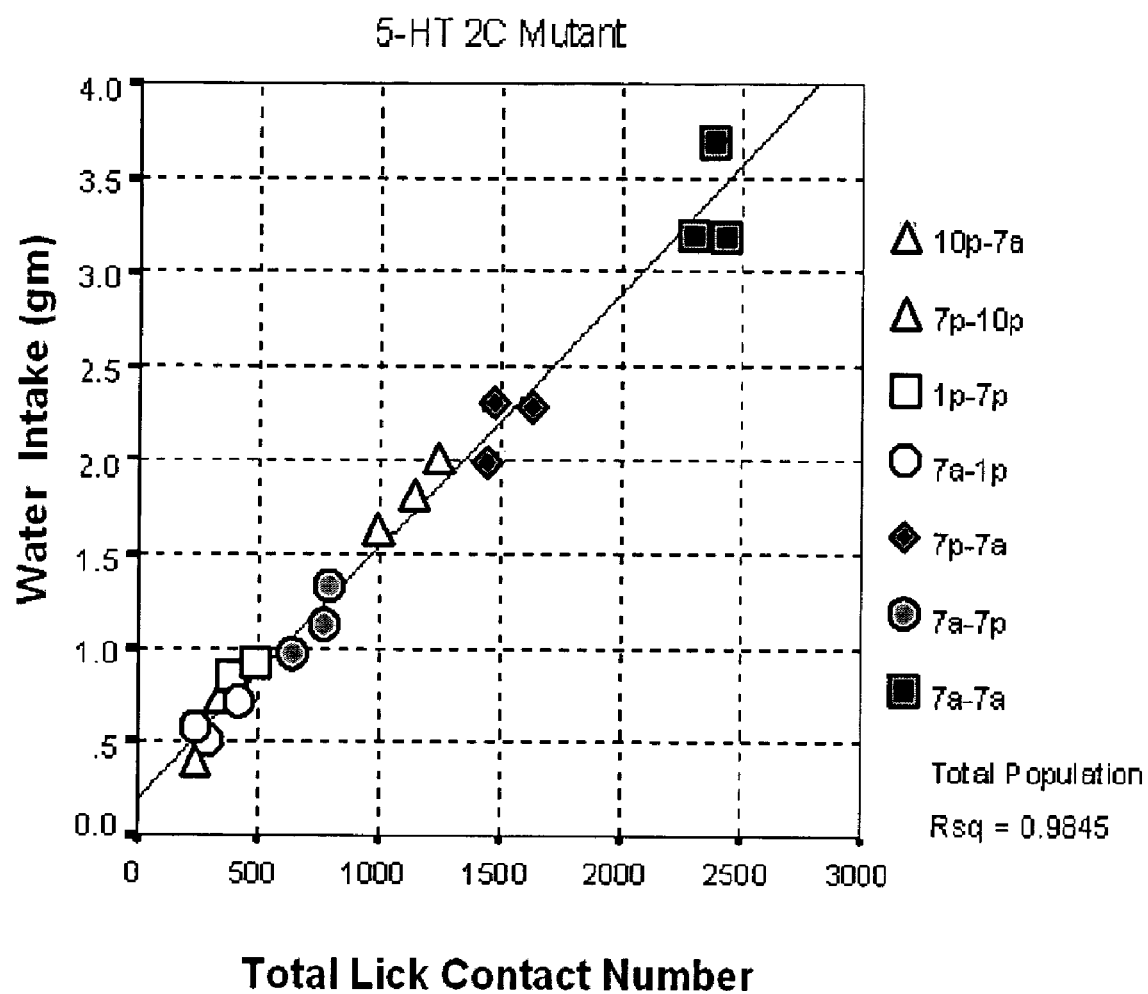

The lickometer 32 is also modified to reduce false positives. As illustrated in FIG. 5, in certain embodiments, the lickometer is shielded from the animal by a plate 52 comprising an opening or slot 54. The plate prevents the animal from simply touching the lickometer, e.g. with its paws. The signals produced by lickometer are therefore simply a function of the animal licking the spout rather than other manipulations of the device. As illustrated by FIGS. 6A and 6B, detector signal (e.g. licks) provided a good measure of actual fluid consumption.

In various embodiments, animal position and/or activity is monitored using a motion or position detection system. Suitable motion or position detection systems include, but are not limited to photobeam arrays, pressure transducers, force plates, video and/or photographic image systems, and the like. In certain embodiments, activity monitoring is accomplished using a two dimensional force plate to provide location in X and Y coordinates.

The monitoring systems of this invention operate at a significantly higher spatial resolution and temporal resolution than typical monitoring systems. It was a surprising discovery that such high resolution data acquisition/data reporting provides a result different in kind than that observed with typical systems. Specifically, the high temporal and spatial resolution permits the detection and recording of behavioral components that could not previously be detected and/or quantified. Moreover, the high temporal and spatial resolution permits curve fitting and quantitative statistical analysis of resulting data sets permitting automated and/or semiautomated detection, quantification, and/or characterization of behavioral components.

In certain embodiments the monitoring systems of this invention report (log) data with a temporal resolution of greater than 20 seconds, preferably greater than 10 or 1 second, more preferably greater than 100 ms, or 50 ms, and most preferably greater than 25 ms, 10 ms, or 1 ms.

Spatial resolution is typically better than 10 cm, preferably better than about 5 cm, more preferably better than about 3 cm or about 2 cm, and most preferably better than about 1 cm, 0.5 cm, or 0.1 cm.

The systems of this invention allow the investigation of multiple behavioral components while leaving the test animals relatively undisturbed. This affords a number of advantages over previous testing schemes. In particular, the systems of this invention allow the investigation of behaviors in context and the simultaneous investigation of multiple behavioral domains. The systems of this invention avoid the effects of test order on animal behavior observed with test batteries. The animals are not subject to the stress of handling and removal from their home cage. The freezing of animals (e.g. observed in zero maze tests) is not observed in these systems.

II. Data Collection and Creation of an Ethogram.

As indicated above, the systems of this invention provide behavioral data and high spatial and temporal resolution. To prevent "data swamping", in certain embodiments, data is not recoded continuously, but rather at the occurrence of events to produce an "event file". An event file is record delineating a collection of events.

Thus, for example, a position/locomotion event file will record an event every time the animal moves a distance greater than a certain predetermined distance (e.g. 1 cm). Each time the animal moves a distance greater than the predetermined distance, the event file can record, e.g. the animal location and the time or the duration from the previous event.

Similarly, for drinking or eating behavior, the event file can record the time of duration between signals from feeder or lickometer.

Figure 7:
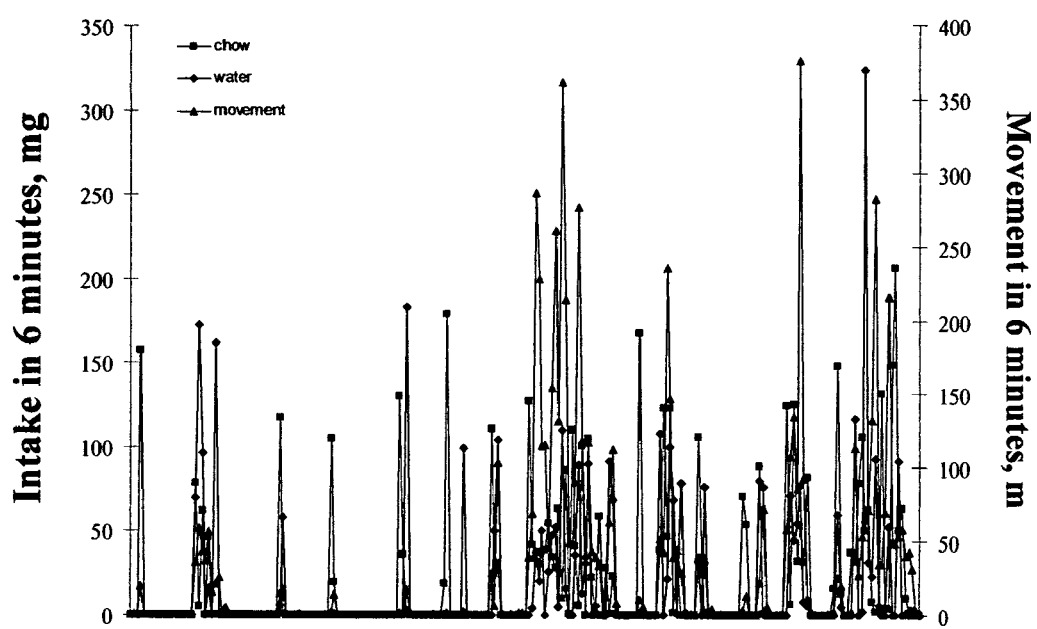
FIG. 7 illustrates feeding, drinking, and movement of an animal in a 6 minute interval.
Figure 8:
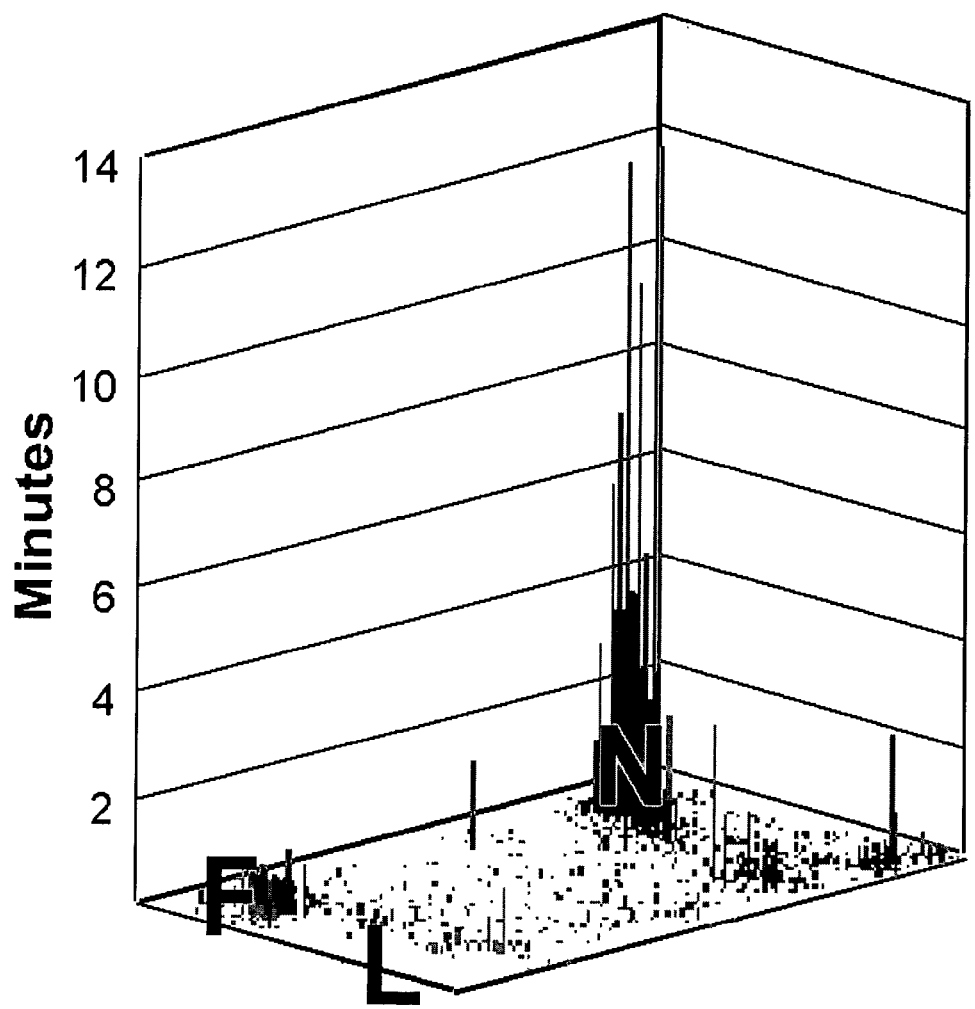
FIG. 8 illustrates a representation of the spatial organization of mouse behavior monitoring device according to this invention. The graph shows the duration of pauses between movement events for one dark cycle displayed based on location within the home cage.
Figure 9:
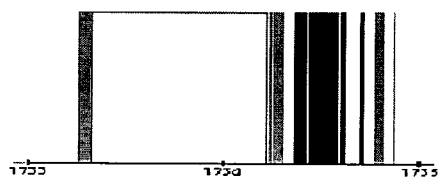
FIG. 9 illustrates three consecutive N—N excursions.
Figure 9:
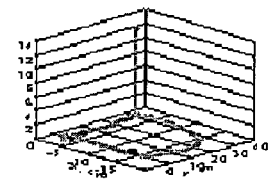
Figure 9:
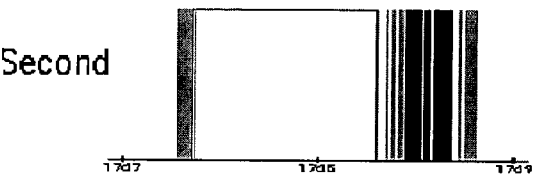
Figure 9:
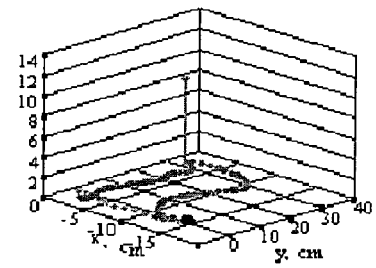
Figure 9:
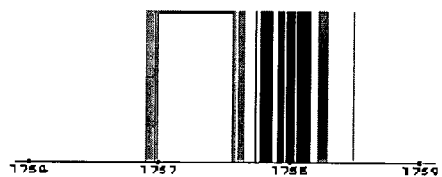
Figure 9:
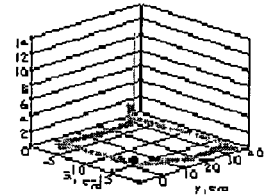
Figure 10:
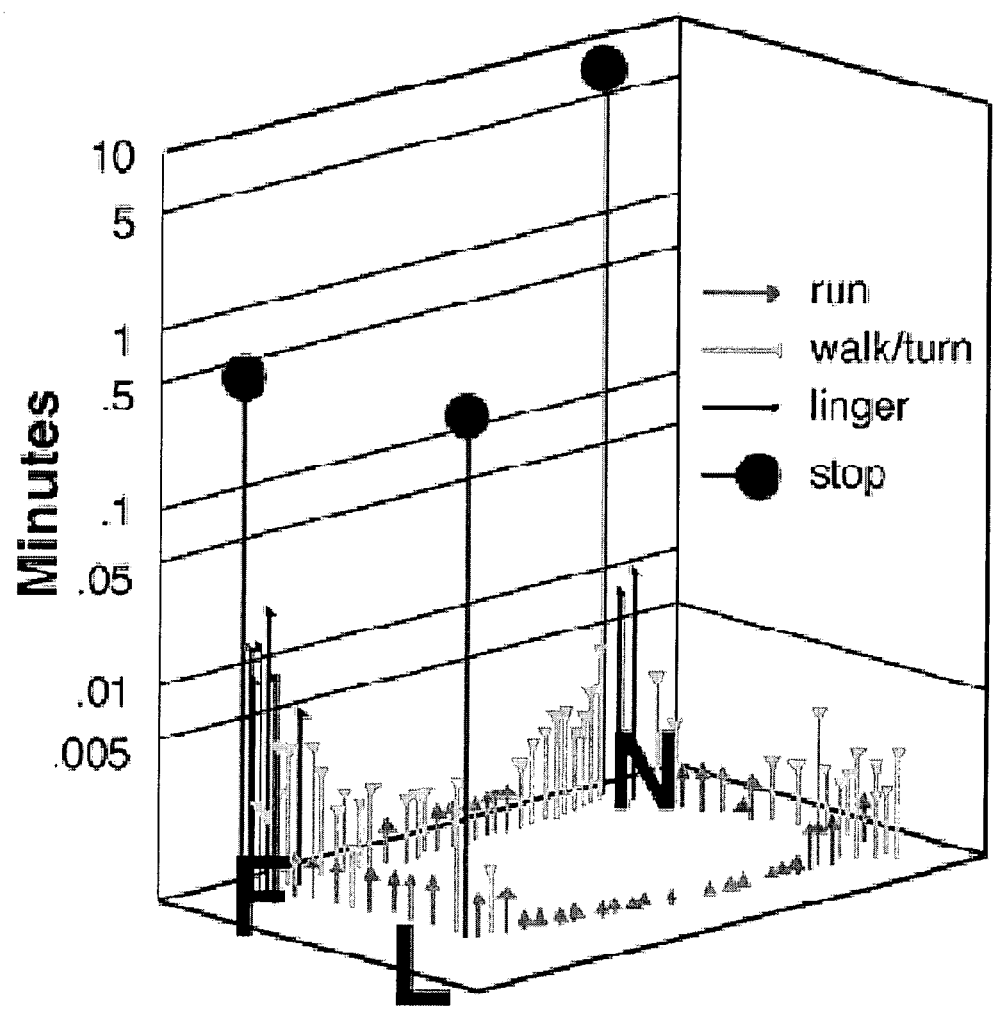
FIG. 10 illustrates an analysis of activity type.

The data thus collected can be used to provide a detailed portrayal of the animals complex behavior during any particular time period (see, e.g., FIG. 7). Thus, for example, FIG. 7 shows illustrates feeding, drinking, and movement of an animal in a 6 minute interval. FIG. 8 illustrates a representation of the spatial organization of mouse behavior monitoring device according to this invention. The graph shows the duration of pauses between movement events for one dark cycle displayed based on location within the home cage. FIG. 9 illustrates three N—N excursions, and FIG. 10 illustrates a specific activity analysis.

Figure 11:
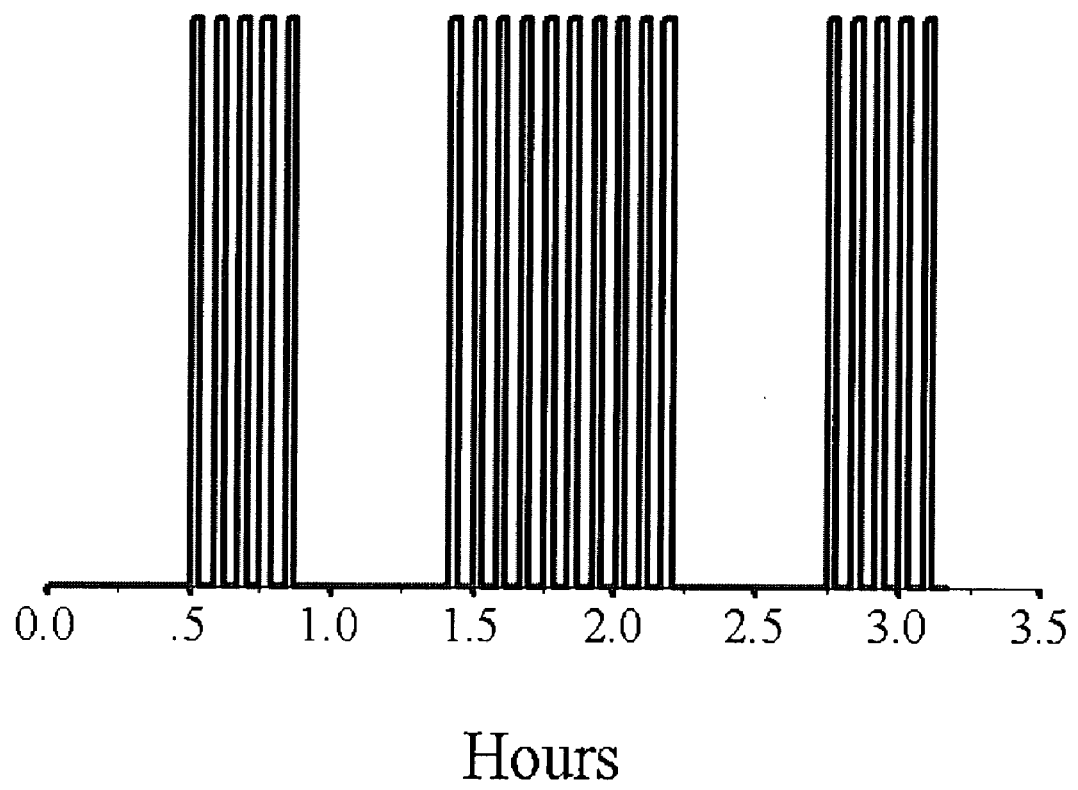
FIG. 11 illustrates the structure of a feeding bout or meal.

The animal(s) behavior can be broken down into bouts and clusters where bouts are repeated occurrences of the same act (e.g., photobeam breaks or food consumption) that appear to cluster together in time (see, e.g., FIG. 11). Clusters are collections of bouts that can define a particular behavior (e.g. feeding, grooming, etc.). The intervals separating the repeating acts give the bout structure and the intervals separating the bouts give the cluster structure. Thus, for example, feeding bouts or "meals" have been described as having two types of intervals: Within-meal intervals and between-meal intervals.

Figure 12:
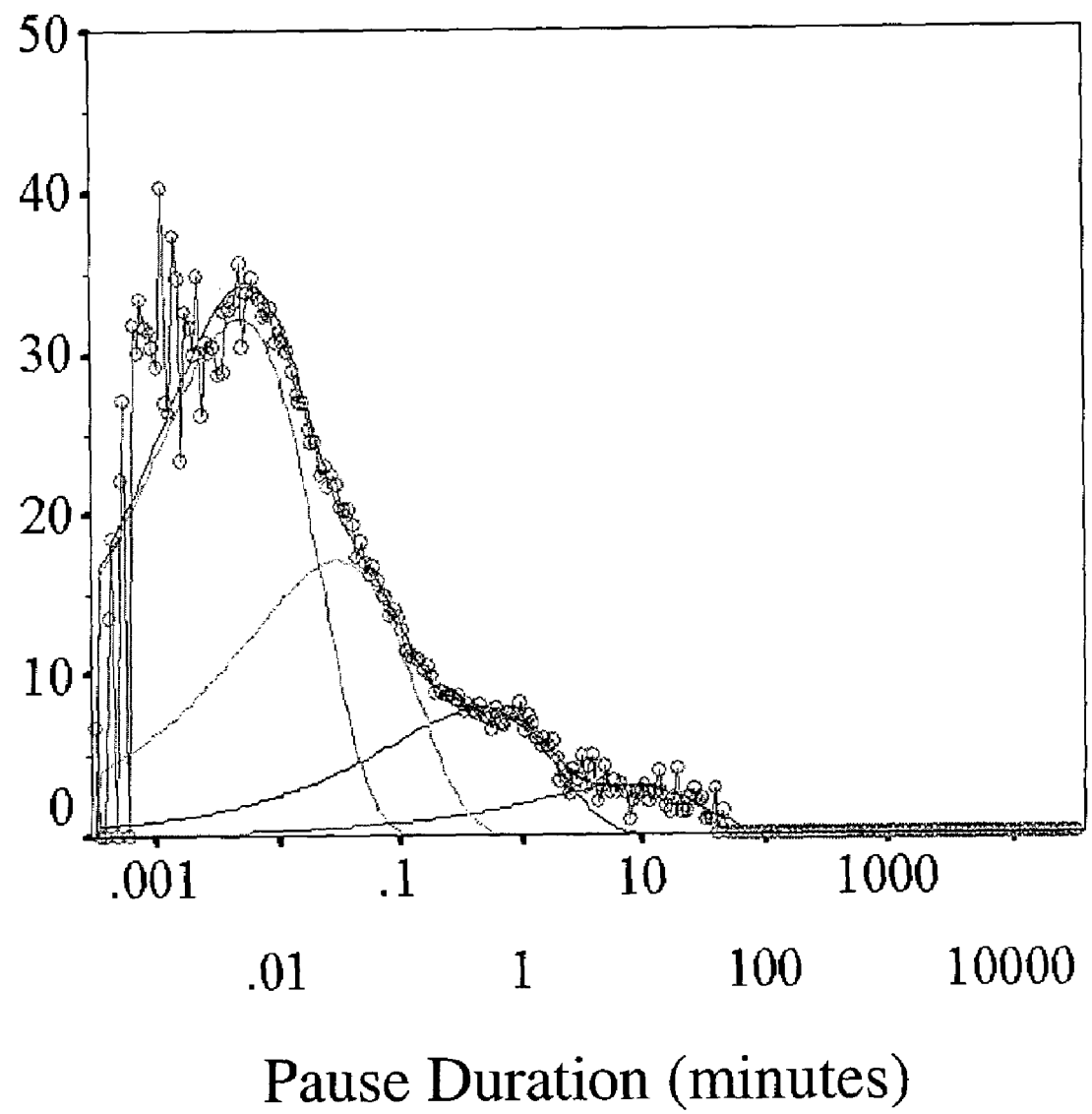
FIG. 12 illustrates an exponential fits to frequency of pauses between movements for different types of movements.

The quantitative data can be analyzed using various numeric and/or statistical methods (see, e.g., FIG. 12) to provided detailed information regarding behavioral patterns. Moreover, this analysis can readily be automated.

The collection of bouts and clusters can be analyzed to provide a behavioral fingerprint of the animal at a particular time and/or under particular conditions.

It was a surprising discovery that a characteristic behavioral finger print can be determined for a particular animal strain or species, or particular knockout animals, or for animals subject to agents (e.g. pharmaceuticals) that alter or potentially alter behavioral patterns.

Figure 13:
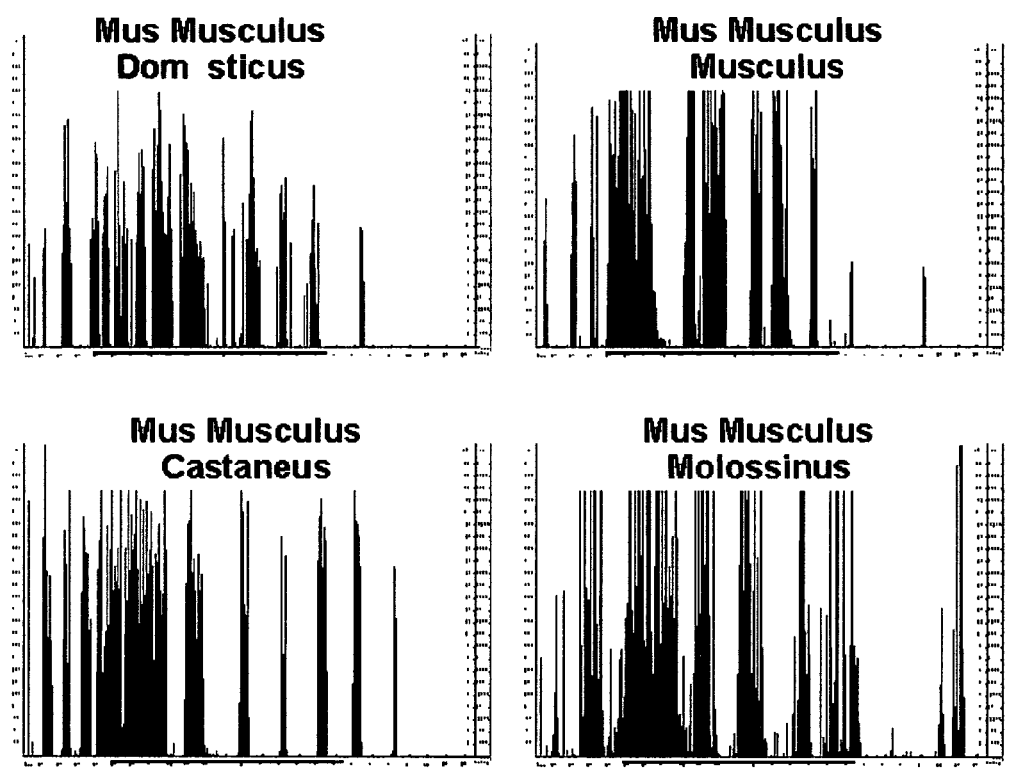
FIG. 13 shows behavioral fingerprints (ethograms) for various mouse species.
Figure 14:
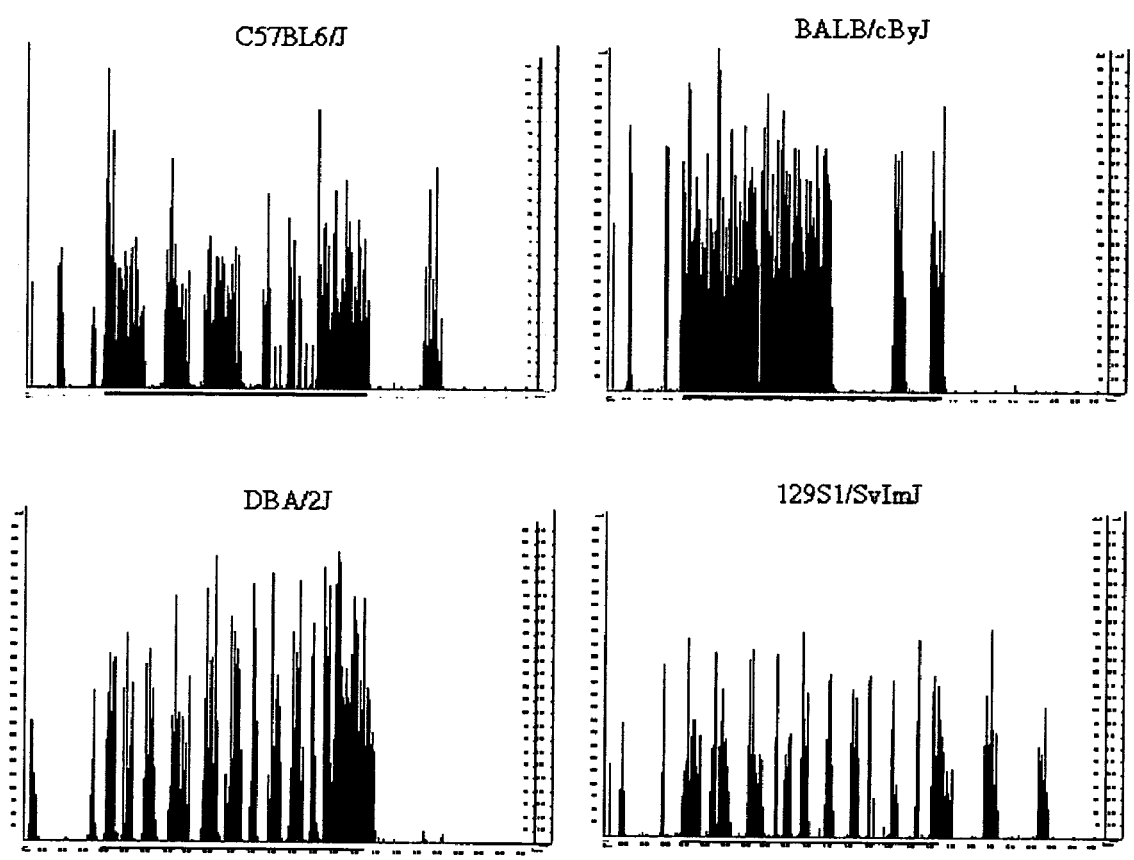
FIG. 14 shows behavioral fingerprints (ethograms) for various mutant (knockout) mice.
Figure 15:
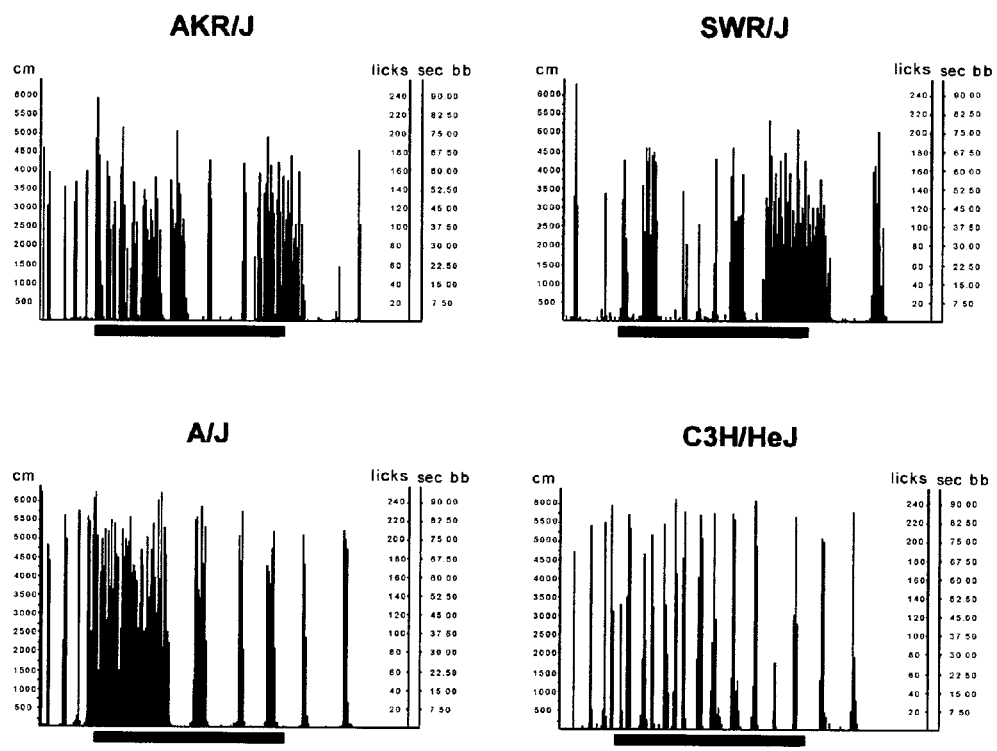
FIG. 15 shows behavioral fingerprints (ethograms) for various mutant (knockout) mice.
Figure 16:
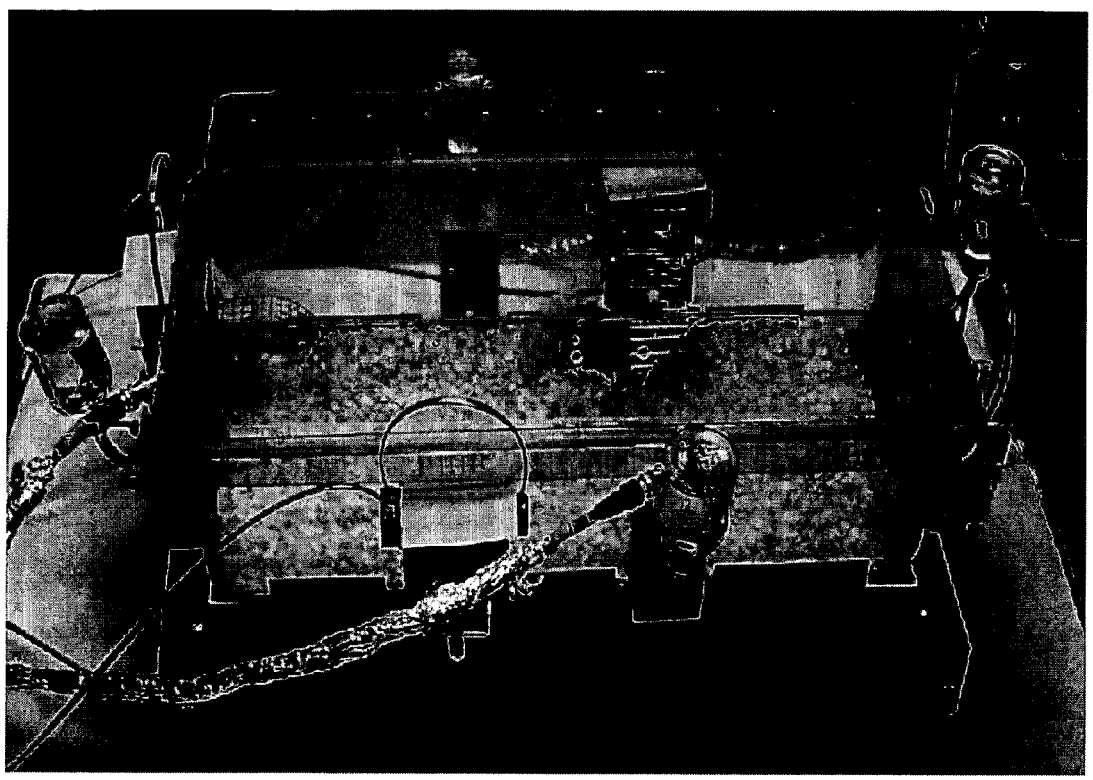
FIG. 16 shows a photograph of a behavioral monitoring system comprising multiple feeders and multiple lickometers.

Thus, for example, FIG. 13 shows behavioral fingerprints (ethograms) for various mouse species, while FIGS. 14 and 15 show behavioral fingerprints for various mousse mutants.

Data can be collected from the position detector(s), and/or lickometer, and/or feeder using standard instrumentation well known to those of skill in the art. As indicated, herein, in certain preferred embodiments, the feeder uses breakage of a photobeam to detect feeding, while the lickometer uses changes in capacitance. Circuits for detecting photobeam breakage and/or capacitance changes are well known to those of skill in the art and are commercially available. Thus, for example, the ENV-254 "head entry" package produced by MED Associates, Inc. (St. Albans, Vt.) is designed to detect photobeam breaks by intrusion of a mouse head into a receptacle. MED Associates also provides a variety of photobeam and/or capacitance circuits for use in lickometers. The various units work with controllers provided by the same company that readily interface with commercially available data acquisition systems. These units are illustrative and not intended to be limiting. Those of skill in the art can readily design custom circuitry for use in the devices of this invention. In addition a number of other detectors are commercially available.

A) Analytical Approaches for Behavioral Pattern Analysis.

1. Classification of Behavioral Elements and their Aggregation into Clusters

One ethologically-based approach is to develop criteria for defining behavioral bouts, where bouts are defined as repeated occurrences of the same behavioral act, which are themselves temporally aggregated into clusters (Machlis (1977) Behaviour 1-70). In one approach, a mixture of probability density distributions are fit to a large set of inter-event intervals using maximum likelihood estimation (see, e.g., Example 2). The feeding data that has been analyzed at this time indicate that the data for most mice are best fit by three to six inter-event intervals. Typically, the first one to three intervals are brief (less than 30 seconds), and seem likely to reflect within-bout intervals where the animal continues to feed and does not leave the feeder. In addition, videotape observation of mice feeding at the feeder suggests that the different brief inter-event intervals seen during a bout of feeding may reflect differences in how the mouse handles the food (using its paws to remove the food and eat versus eating directly with its mouth while its head is in the food drawer). The next to last distribution typically has a mean of around one minute and seems likely to represent the inter-bout interval. The presence of the last distribution indicates that the feeding bouts themselves are clustered together in time. This approach is readily automated to apply bout and cluster criteria to the behavioral record (e.g. as illustrated in Example 2).

It was a surprising discovery that this technique can be used to classify the behavior of the mouse into bouts of feeding, drinking, and movement and in addition, a higher level of organization-clusters of bouts, can also be detected. The preliminary work was done by visually inspecting an inter-event interval frequency histogram for each mouse and making initial estimates of the parameters of the fit that were then used to initiate an iterative fitting routine (modified Newton-Raphson) (Press et al. (1992) *Numerical Recipes in C.*, Cambridge University Press, New York). This was necessary because fitting algorithms like Newton-Raphson are sensitive to the initial estimate provided, because while they work well to identify local maxima, they often fail to find the global maxima. Also, maximum likelihood estimation provides no model selection criteria, i.e. there is no robust analytical way to choose the optimal number of distributions to use in the mixture. In order to solve this problem and automate this procedure, we use a technique developed by Maneesh Sahani for the sorting of electrophysiological data (Sahani (1999) *Latent variable models for neural data analysis*. Thesis, California Institute of Technology). This method has a number of benefits relative to other algorithms—it implements a global maximization algorithm similar in spirit to methods such as a deterministic annealing expectation maximization, and split and merge expectation maximization. Unlike these methods, however, it allows simultaneous automatic selection of the best number of components in the mixture (clusters).

The strategy may then be used to identify bouts of not only feeding but also of drinking and movement in an analogous automated high throughput manner.

2. Characterization of Circadian Influences on Cluster Properties

Inspection of home cage behavioral patterns reveals that behavioral clusters are strongly modulated by circadian factors. For example, cluster durations are briefer during the light cycle than the dark cycle for C57BL/6 mice (see, e.g., Example 2). Moreover, even within the dark cycle, cluster sizes of C57BL/6 mice vary in a systematic way—they are largest early and late in the dark cycle. Circadian influences on behavioral patterns vary greatly among strains, many of which do not display the large light-onset/light-offset clusters observed in the C57BL/6 strain. For example, A/J mice do not appear to have large dark-offset clusters, and 129S1/SvImJ animals do not form large clusters at any time of day. Single gene energy balance mutations also influence the periodicity of feeding, as shown by loss of the C57BL/6 pattern and replacement by clusters displaying less diurnal variability in size, as well as an apparent 3-hr periodicity.

We thus observe that behavioral clusters vary with time, exhibit both circadian (24 hr periodicity) and ultradian (less than 24 hr periodicity) rhythms, and are highly sensitive to genetic influences. These important features of the behavioral patterns can be quantified using the methods described herein. In one illustrative approach, data is binned and converted to the frequency domain using the Lomb-Scargle algorithm. This approach, developed for the analysis of astrophysical data, has several advantages (Ruf (1999) *Biol. Rhythm Res.* 30: 178–201). These include the capacity of the algorithm to deal with missing data points. Also, the Lomb-Scargle algorithm provides a robust method for determining the statistical significance of the peaks found in the periodograms (periodograms provides visual depictions of the extent to which behavioral events are organized into periods of various durations). These benefits make this algorithm a good choice power spectrum estimator for this data set.

3. Characterization of Within-Cluster Behavioral Patterns

In addition to objectively defining behavioral clusters and the diurnal modulation of their properties, the methods described herein permit examination of patterns of behavioral units within clusters. One approach is to hierarchically assess the transition probabilities between successively longer sequences of behavior. For example, movement, feeding and drinking can be designated as three distinct behavioral states. Because, in certain embodiments, the feeder and lickometer are separated, at different sites in the cage, a feeding animal has a higher probability of transitioning to a movement state than to drinking (since the mouse must move to reach the lickometer). Progressing from this somewhat trivial example, the analysis can be extended consider the relative probabilities of progressively longer sequences of behavior. For example, it is possible to determine whether the feeding→movement→feeding sequence is more or less probable than the feeding→movement→drinking sequence.

In another embodiment, an alternative approach for identifying behavioral patterns that utilizes concepts from information theory, a computational approach enabling quantitative assessment of the extent to which events are organized. Elements of patterned behaviors are more predictive of future actions than those of random or disorganized behaviors. It is possible to therefore calculate the predictive information for recorded data sequences. This allows quantitative assessment of the extent to which experimental manipulations alter the patterning of spontaneous behavior.

The characterization of within-cluster behavior can also be further clarified by a more detailed analysis of movement. First, an attempt will be made to classify locomotor behavior with regard to the speed and turning angle of the movements. The focus here would be to identify movement states such as walking, running, or lingering. In one approach, pause durations between movements will be fit with log normal distributions and assessments performed of the extent to which groups of movements generated from the different distributions have distinct properties such as differences in spatial spread or turning angle. Another strategy involves application of a predictive information approach to a series of movements in a search for abrupt changes in information content reflecting changes in the movement type.

Spatial information can also be used to examine the behavior of the mice during intervals between bouts of ingestive behavior and/or sleep. In certain "ethograms", bouts of feeding are separated by interbout intervals (IBIs) of different lengths. The locomotor paths taken by this animal during the IBIs (3 round-trips from the feeder) are distinct. For example, in certain ethograms, the first reflects a round-trip between the feeder and lickometer. The second incorporates a visit to the next. The third reflects a different behavior that tends to occur near the end of bouts—animals sweep bedding along the outside of the niche, gathering material that will be used to seal the opening to the niche. Once derived, these paths can be treated as images and clustered using standard pattern recognition algorithms.

4. Classification Algorithms for Group Comparisons

Once the behavioral elements and their organization have been characterized for individual mice, comparisons can be made between treatment groups. The large volume and complexity of behavioral data and the inability to control all of the determinants of behavioral variability create challenges in distinguishing uncontrolled individual differences from group effects arising from planned experimental manipulations. Several statistical modeling techniques can be applied to this problem. One approach utilizes hidden Markov models (HMMs) (see, e.g., Rabiner (1989) *Proc IEEE* 77: 257–285). Hidden Markov models are useful for modeling time-dependant data. The heart of a hidden Markov model is statistical in nature—the underlying system generating the data is modeled as a statistical process with a number of "hidden" states that make transitions from one to another in such a way that the probability that the system is in one state at a certain time is only dependant on what state the system was in at the previous time step. These hidden states then generate the observable sequence of behavioral units, such as feeding, drinking and movement bouts. To generate the model, various optimization techniques are used to find the HMM that best reflects the data. To generate the model, one can use standard techniques such as the Baum-Welch algorithm to find the HMM that best reflects the data. These outputs provide a much more compact representation of the data and can be used to quantify the extent to which behavioral patterns differ. The ability to make such distance ("relatedness") measurements permits the use of standard clustering techniques (hierarchical clustering, self-organizing maps, etc) to identify groups of animals with similar patterns of behavior. Post-hoc analyses of the particular features of behavioral patterns that distinguish groups can provide insights into the neurobehavioral processes that are altered by experimental manipulations.

While the foregoing analytical approaches are described in detail with respect to mice, it will be appreciated that, using the teaching provided herein, they can readily be applied to other mammals (e.g. rats, cats, dogs, primates, etc.).

B) Embodiment in a Programmed Digital Apparatus

The invention may be embodied in a fixed media or transmissible program component containing logic instructions and/or data that when loaded into an appropriately configured computing device cause that device to perform one or more of the analytical operations described above on an ethological dataset (e.g. classify behavior into bouts, identify circadian patterns to behavioral bouts, classify within cluster behaviors, compare groups, etc.) according to the methods of this invention.

Figure 26:
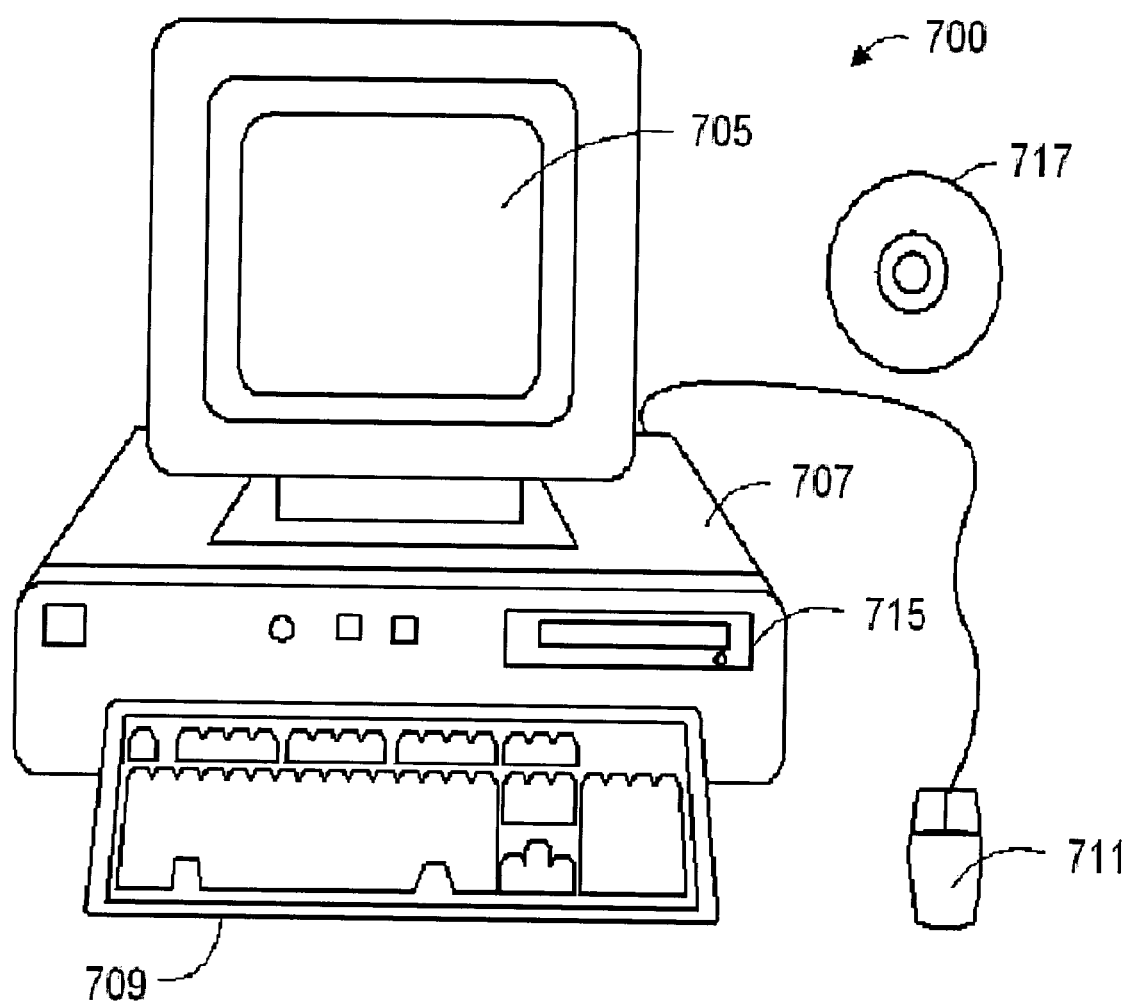
FIG. 26 illustrates a representational digital device 700 according to the present invention.

FIG. 26 shows digital device 700 that may be understood as a logical apparatus that can read instructions from media 717 and/or network port 719. Apparatus 700 can thereafter use those instructions to direct analysis of behavioral data, create, sort, search, and read behavioral database, and the like. In certain embodiments, the digital device can be directly connected to one or more cage behavioral systems according to this invention and, optionally function in real-time. In certain embodiments, the digital device can simply access, analyze, and/or manipulate previously collected data.

One type of logical apparatus that may embody the invention is a computer system as illustrated in 700, containing CPU 707, optional input devices 709 and 711, disk drives 715 and optional monitor 705. Fixed media 717 can be used to program such a system and could can represent disk-type optical and/or magnetic media, and/or a memory or the like. Communication port 719 can also be used to program such a system and can represent any type of communication connection (e.g. a connection to a data acquisition system).

The invention also may be embodied within the circuitry of an application specific integrated circuit (ASIC) or a programmable logic device (PLD). In such a case, the invention may be embodied in a computer understandable descriptor language that can be used to create an ASIC or PLD that operates as herein described.

C. Embodiment in a Web Site.

The methods of this invention can be implemented in a localized or distributed computing environment. In a distributed environment, the methods can be implemented on a single computer comprising multiple processors or on a multiplicity of computers. The computers can be linked, e.g. through a common bus, but more preferably the computer(s) are nodes on a network. The network can be a generalized or a dedicated local or wide-area network and, in certain preferred embodiments, the computers may be components of an intra-net or an internet.

In certain internet embodiments, a client system typically executes a Web browser and is coupled to a server computer executing a Web server. The Web browser is typically a program such as Microsoft's Internet Explorer, or NetScape or Opera. The Web server is typically, but not necessarily, a program such as IBM's HTTP Daemon or other WWW daemon. The client computer can be bi-directionally coupled with the server computer over a line or via a wireless system. In turn, the server computer can be bi-directionally coupled with a website (server hosting the website) providing access to software implementing the methods of this invention.

A user of a client connected to the Intranet or Internet can cause the client to request resources that are part of the web site(s) hosting the application(s) providing an implementation of the methods of this invention. Server program(s) then process the request to return the specified resources (assuming they are currently available). A standard naming convention has been adopted, known as a Uniform Resource Locator ("URL"). This convention encompasses several types of location names, presently including subclasses such as Hypertext Transport Protocol ("http"), File Transport Protocol ("ftp"), gopher, and Wide Area Information Service ("WAIS"). When a resource is downloaded, it may include the URLs of additional resources. Thus, the user of the client can easily learn of the existence of new resources that he or she had not specifically requested.

The software implementing the method(s) of this invention can run locally on a server hosting the website in a true client-server architecture. Thus, the client computer posts requests to the host server which runs the requested process (es) locally and then downloads the results back to the client. Alternatively, the methods of this invention can be implemented in a "multi-tier" format wherein a component of the method(s) are performed locally by the client. This can be implemented by software downloaded from the server on request by the client (e.g. a Java application) or it can be implemented by software "permanently" installed on the client.

In one embodiment the application(s) implementing the methods of this invention are divided into frames. In this paradigm, it is helpful to view an application not so much as a collection of features or functionality but, instead, as a collection of discrete frames or views. A typical application, for instance, generally includes a set of menu items, each of with invokes a particular frame—that is, a form which manifest certain functionality of the application. With this perspective, an application is viewed not as a monolithic body of code but as a collection of applets, or bundles of functionality. In this manner from within a browser, a user would select a Web page link which would, in turn, invoke a particular frame of the application (i.e., subapplication). Thus, for example, one or more frames may provide functionality for inputing and/or accessing ethograms for particular animals or strains, while another frame provides tools for identifying bouts, clusters, circadian patterns, and the like.

In addition to expressing an application as a collection of frames, an application can also be expressed as a location on the Intranet and/or Internet; a URL (Universal Resource Locator) address pointing the application. Each URL preferably includes two characteristics: content data for the URL (i.e., whatever data is stored on the server) together with a data type or MIME (Multipurpose Internet Mail Extension) type. The data type allows a Web browser to determine how it should interpret data received from a server (e.g., such as interpreting a .gif file as a bitmap image). In effect, this serves as a description of what to do with the data once it is received at the browser. If a stream of binary data is received as type HTML, the browser renders it as an HTML page. If instead it is received type bitmap, on the other hand, the browser renders it as a bitmap image, and so forth.

In Microsoft Windows, different techniques exist for allowing a host application to register an interest in a data object (i.e., data of a particular type). One technique is for the application to register with Windows an interest in a particular file extension for an (e.g., .doc—"Microsoft Word Document"); this is the most common technique employed by Window applications. Another approach, employed in Microsoft Object Linking and Embedded (OLE), is the use of a class Globally Unique Identifier or GUID—a 16-byte identifier for indicating a particular server application to invoke (for hosting the document having the GUID). The class ID is registered on a particular machine as being connected to a particular DLL (Dynamic Link Library) or application server.

In one embodiment of particular interest, a technique for associating a host application with a document is through a use of MIME types. MIME provides a standardized technique for packaging a document object. It includes a MIME header for indicating which application is appropriate for hosting the document, all contained in a format suitable for transmission across the Internet.

In one preferred embodiment, the methods of the present invention are implemented, in part, with the use of a MIME type specific to the use of the methods of this invention. The MIME type contains information necessary to create a document (e.g., Microsoft ActiveX Document) locally but, in addition, also includes information necessary to find and download the program code for rendering the view of the document, if necessary. If the program code is already present locally, it need only be downloaded for purpose of updating the local copy. This defines a new document type which includes information supporting downloadable program code for rendering a view of the document.

The MIME type may be associated with a file extension of .APP. A file with the .APP extension is an OLE Document, implemented by an OLE DocObject. Because the .APP file is a file, it can be placed on a server and linked to using an HTML HREF. The .APP file preferably contains the following pieces of data: (1) the CLSID of an ActiveX object, which is an OLE Document Viewer implemented as one or more forms appropriate to the use of the methods of this invention; (2) the URL of the codebase where the object's code can be found, and (3) (optionally) a requested version number. Once the APP DocObject handler code is installed and registers the APP MIME type, it can be used to download an .APP file into the user's Web browser.

On the server side, since the .APP file is really a file, the Web server simply receives the request and returns the file to the client. When the APP file is downloaded, the .APP DocObject handler asks the operating system to download the codebase for the object specified in the .APP file. This system functionality is available in Windows through the CoGetClassObjectFromURL function. After the ActiveX object's codebase is downloaded, the .APP DocObject handler asks the browser to create a view on itself, for instance, by calling the ActivateMe method on the Explorer document site. The Internet Explorer then calls the DocObject back to instantiate a view, which it does by creating an instance of the ActiveX view object from the code that was downloaded. Once created, the ActiveX view object gets in-place activated in the Internet Explorer, which creates the appropriate form and all its child controls.

Once the form is created, it can establish connections back to any remote server objects it needs to perform its functions. At this point, the user can interact with the form, which will appear embedded in the Internet Explorer frame. When the user changes to a different page, the browser assumes responsibility for eventually closing and destroying the form (and relinquishing any outstanding connections to the remote servers).

In one preferred embodiment, from an end-user's desktop, the entry point to the system is the corporate home or the home page of another particular web-site. The page can, optionally, include, in a conventional manner, a number of links. In response to the user clicking on a particular link to an application page (e.g. a page providing the functionality of the methods of this invention), the web browser connects to the application page (file) residing on the server.

In one embodiment, where the user requests access to the methods of this invention, the user is directed to a particular page type, e.g., an application (appdoc) page for in-place execution of an application (implementing one or more elements of the methods of this invention) in the Web browser. Since each application page is located using an URL, other pages can have hyperlinks to it. Multiple application pages can be grouped together by making a catalog page that contains hyperlinks to the application pages. When the user selects a hyperlink that points to an application page, the Web browser downloads the application code and executes the page inside the browser.

Upon the browser downloading the application page, the browser (based on the defined MIME type) invokes a local handler, a handler for documents of a type. ore particularly, the application page preferably includes a Globally Unique Identifier (GUID) and a codebase URL for identifying a remote (downloadable) application to invoke for hosting the document. Given the document object and the GUID which arrive with the application page, the local handler looks to the client machine to see if the hosting application already resides locally (e.g., by examining Windows 95/NT registry). At this point the local handler can choose to invoke a local copy (if any) or download the latest version of the host application.

Different models of downloading code are commonly available. When code is downloaded, a "code base" specification (file) is initially requested from the server. The code base itself can range from a simple DLL file to a Cabinet file (Microsoft .cab file) containing multiple compressed files. Still further, an information (e.g., Microsoft .inf) file can be employed for instructing the client system how to install the downloaded application. These mechanisms afford great flexibility in choosing which component of an application gets downloaded and when.

For preferred embodiments, the machinery employed for actually downloading program code itself relies on standard Microsoft ActiveX API (Application Programming Interface)-calls. Although the ActiveX API does not provide native support for Web-delivered applications, its API can be invoked for locating the correct version of the program code, copying it to the local machine, verifying its integrity, and registering it with the clients operating system. Once the code has been downloaded, the handler can proceed to invoke the now-present application host for rendering the document object (in a manner similar to invoking the hosting application through the registry if it were already installed).

Once the hosting application (OLE server) is loaded at the client, the client system can employ the OLE document view architecture to render the application correctly within the browser, including using conventional OLE methodology for adding the application's menu to that of the browser and for correctly re-sizing the application upon a re-size of the browser (as oppose to requiring the application to execute within a single Active X control rectangle—the limitation previously noted). Once the application is executing at the client, it can execute remote logic such as using RPC (Remote Procedure Call) methodology. In this manner logic which is preferably implemented as remote procedure(s) can still be used.

In certain preferred embodiments, the methods of this invention are implemented as one or more frames providing the following functionality. Function(s) to organize, search, save, and retrieve raw behavioral data or reduced/processed behavioral data (e.g. data produced by the devices of this invention), functions to identify and/or classify bouts, functions to identify/classify clusters of bouts, functions to identify/classify circadian patterns, functions to classify/identify within bout behaviors, functions to compare and contrast ethograms, functions to graphically represent ethograms, and the like.

In addition, the functions can also, optionally, provides access to private and/or public databases accessible through a local network and/or the intranet whereby one or more ethograms contained in the databases can be input into the methods of this invention.

Methods of implementing Intranet and/or Intranet embodiments of computational and/or data access processes are well known to those of skill in the art and are documented in great detail (see, e.g., Cluer et al. (1992) *A General Framework for the Optimization of Object-Oriented Queries, Proc SIGMOD International Conference on Management of Data*, San Diego, Calif., Jun. 2–5, 1992, SIGMOD Record, vol. 21, Issue 2, Jun., 1992; Stonebraker, M., Editor; ACM Press, pp. 383–392; ISO-ANSI, Working Draft, "Information Technology-Database Language SQL", Jim Melton, Editor, International Organization for Standardization and American National Standards Institute, July 1992; Microsoft Corporation, "ODBC 2.0 Programmer's Reference and SDK Guide. The Microsoft Open Database Standard for Microsoft Windows.™. and Windows NT.™., Microsoft Open Database Connectivity.™. Software Development Kit", 1992, 1993, 1994 Microsoft Press, pp. 3–30 and 41–56; ISO Working Draft, "Database Language SQL-Part 2: Foundation (SQL/Foundation)", CD9075–2:199. chi. SQL, Sep. 11, 1997, and the like).

Those skilled in the art will recognize many modifications can be made to this configuration without departing from the scope of the present invention. For example, in a two-tier configuration, the server system executing the functions of the WWW gateway may also execute the functions of the Web server. For example, any one of the above described embodiments could be modified to accept requests from users/user terminals that are in a format other than a URL. Yet another modification would involve the adaptation to a multi-manager environment.

III. Uses of the Bahavioral Monitoring System and Ethograms.

The equipment and methods described herein can be used in a wide variety of contexts. For example, the creation of ethograms for various knockout animals provides a direct link between genetic variations and behavioral repertoire. Moreover, the combination of such analyses of knockout animals in conjunction with the administration of various compounds, provides a powerful mechanism for dissecting the biological basis of overconsumption, addiction, and the like and for identifying the genetic component(s) associated with particular behavioral patterns.

In addition, the methods of this invention can readily be used to investigate possible psychoactive properties of essentially any test agent. Such an evaluation can become a critical component of any regulatory approval process for pharmaceuticals, food additives, compounds released into the environment, and the like.

Such methods can, for example, involve contacting (administering to) a animal subject with one or more test agents of interest. One or more behavioral finger prints (ethograms) under defined conditions can then be determined for the animal and compared to appropriate controls (e.g. ethograms determined for a similar negative control animal (e.g. an animal administered less or no test agent, or various positive controls).

The controls can be determined at the time the test experiment is done, and/or cam be ethograms done previously and possibly compiled into a reference ethogram database.

The following illustrates one use of the equipment and methods of this invention:

Quantitative approaches to behavioral pattern assessment can be used to examine the impact of ethanol on the organization of home cage behavior in the mouse. One series of studies examines the behavioral consequences of a standard 2-bottle voluntary ethanol intake situation. Ethanol consumption patterns and their effects on home cage behavioral organization are correlated with blood ethanol concentrations. To assess levels of intoxication, standard tests of ethanol-related behaviors cam be performed at times of peak blood ethanol concentrations. A subsequent analogous series of studies can be performed in animals rendered tolerant to ethanol by prior exposure to ethanol vapor. Following stabilization of behavioral patterns, effects of ethanol withdrawal on home cage behavioral organization can be determined and correlated with standard behavioral indices of withdrawal. These tests can be applied to mouse strains known to exhibit high and low levels of ethanol preference.

C57BL/6J and DBA/2J strains can be used to determine how the effects of ethanol on behavioral patterns compare in high and low ethanol-preferring strains that have been used extensively in genetic studies of alcohol preference (46). Although C57BL/6J mice display high ethanol preference, it is unclear whether they consume ethanol for its pharmacological properties or for its taste or caloric content (47). To determine whether mice are drinking alcohol for its pharmacological effects, it is necessary not only to measure the patterns of intake, but also to know the resultant concentrations of alcohol that are achieved in the blood. We can thus apply a metabolic model for predicting the blood ethanol concentrations (BEC) of a mouse based on measurement of its rates of intake, distribution, and elimination (4). C57BL/6J and DBA/2J mice will be given 10% ethanol by intragastric gavage, and blood samples collected to estimate the rates of absorption, distribution, and elimination for use in calibrating the metabolic model. The capacity to continuously predict the BEC of mice using continuous monitoring of intake can then be tested. Mice are placed in the behavioral monitors in the presence of a water bottle and a 10% ethanol bottle. Once intake is stable, mice are removed from the monitors at several times of day BEC determinations, and the degree of correlation of predicted levels with ethanol concentrations measured from blood samples will be tested. Corrections to the model will be made at this point if necessary, and the experiment repeated until an adequate capacity to predict BEC from the rate of ingestion of 10% ethanol using continuous monitoring has been achieved.

Because genetic studies of ethanol intake frequently involve 2-bottle testing using 10% ethanol vs water (48), we can examine the impact of ethanol on home cage behavior using this paradigm. C57BL/6J and DBA/2J mice will be exposed to this situation, along with control groups that receive water in both bottles. Bout and cluster analysis of ethanol intake can be examined along with analysis of the influence of ethanol on home cage behavioral patterns. We can use our data on the ingestion of ethanol to continuously predict the BEC of each mouse and compare these predicted levels across strains and experimental day. These BEC level predictions can be plotted against activity, drinking, and feeding for initial visual examination of differences in the patterns of ethanol intake, and its impact on other behaviors across the strains. We can correlate patterns of movement, derived from the behavioral analysis, with BEC in an attempt to detect signs of intoxication. At the end of the data collection period, subsets of mice from each strain are removed from their cages at times predicted to correspond to maximal levels of BEC. Animals can be tested on routine measures of intoxication including rotorod testing of coordination and elevated zero-maze testing of anxiety levels. After these tests, blood samples will be taken and compared to the values predicted by monitoring of consumption. The performance of test mice and control mice removed from cages at the same times will then be compared to assess whether or not the test mice from each strain voluntarily consume sufficient quantities of alcohol to exhibit significant signs of intoxication.

It is not certain that voluntary consumption of the 10% ethanol solution will result in sufficient intake to produce intoxication and dependence. To examine the impact of ethanol dependence and withdrawal on behavioral organization, mice can be rendered ethanol-dependent using chronic exposure to ethanol vapor (CEEV) (49, 50). C57BL/6J and DBA/2J mice can be placed in cages housed within chambers equipped to deliver ethanol vapor (test group) or water vapor (control) for four weeks. BEC can be periodically monitored to assess the adequacy of vapor exposure (49–52). Monitoring will can be carried out over 2 weeks, and we expect to observe significant increases in voluntary ethanol intake in the chronic ethanol vapor exposed group. Alterations in the patterns of ingestion responsible for this increase in intake can be determined, and the impact of this increased intake on patterns of home cage behavior can be analyzed. Testing for coordination impairment and reduction of anxiety during predicted peak BEC levels can be performed in one group of mice. Ethanol can be removed from the lickometers of another group of animals to determine behavioral patterns associated with ethanol withdrawal. We would anticipate reductions of sleep episodes, anorexia, adipsia and fragmentation of activity patterns (53, 54).

Another example of the use of the devices of this invention is the analysis of the impact of serotonin receptor mutations on ethanol intake, dependence and ethanol influences on behavioral organization. Although brain serotonin systems strongly influence ethanol-related behaviors, the contributions of particular 5-HT receptor subtypes to these actions of serotonin are unclear. We have generated 3 lines of null mutant mice, each lacking a 5-HT receptor subtype that may significantly influence ethanol responses. The devices of this invention can be used to evaluate the impact of these mutations on behavioral patterns associated with ethanol intake and dependence. The lines to be tested are: 1) 5-HT2CR mutants, that exhibit enhanced mesolimbic dopaminergic activity and elevated cocaine self-administration, 2) 5-HT1AR mutants, that display a global elevations of serotonergic tone and enhanced anxiety-related behavior and 3) 5-HT6R mutants, that display reduced sensitivity to acute behavioral effects of ethanol and enhanced ethanol self-administration. Although changes in ethanol pharmacokinetics are not anticipated in these mutants, this will be confirmed experimentally. Separate cohorts of mutant and wild type mice will then be tested in the standard 2-bottle voluntary ethanol intake situation with and without prolonged exposure to ethanol vapor in the manner described in Aim 2.

EXAMPLES

The following examples are offered to illustrate, but not to limit the claimed invention.

Example 1

Figure 1:
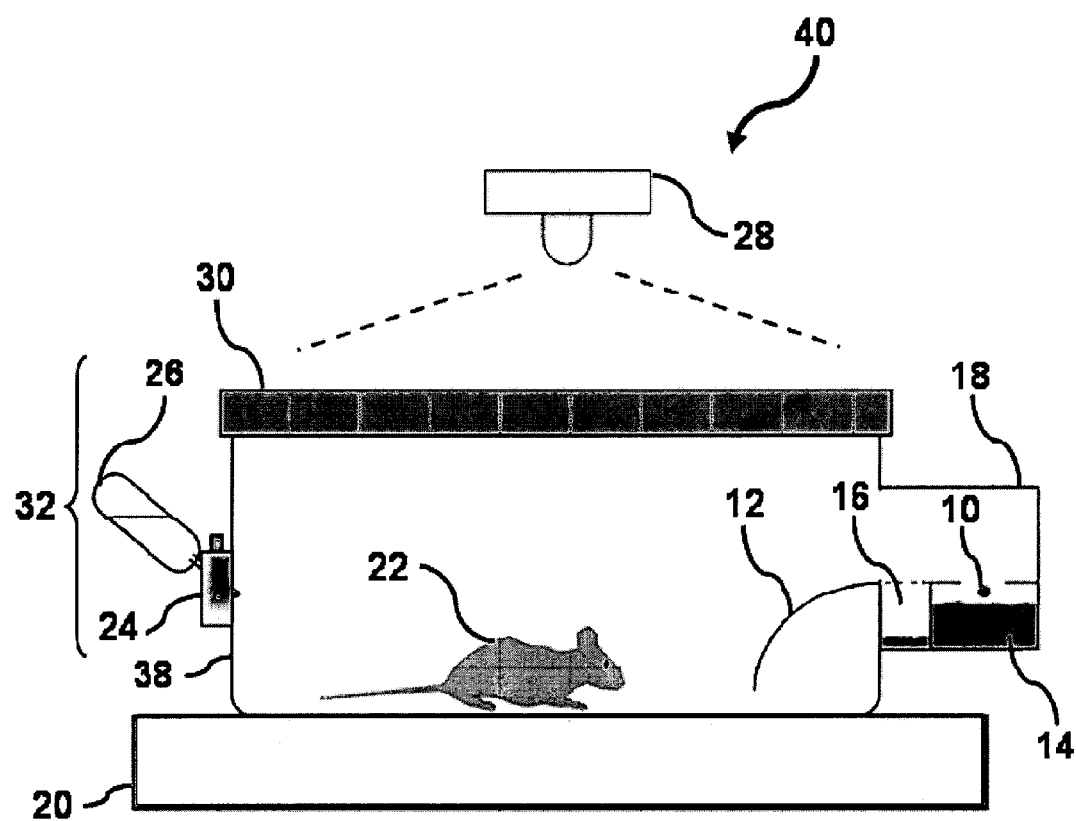
FIG. 1 schematically illustrates a behavior analysis system 40 comprising an enclosure 38, an activity platform 20, a lickometer 32 comprising a water bottle 26 and a detector 24, a feeder 18 comprising a ramp 12, a detector 10 (e.g. a photobeam), food 14, and an overflow trough 16. The system is illustrated with a test animal 22 (e.g. a mouse), and an optional video and/or image acquisition system 28. In this illustration, the enclosure 38 is topped with a cover 30. In certain embodiments, feeding is measured by a photobeam and photobeam detector with 1 msec resolution when animals break the photobeam in order to reach food in the feeder. Animals accessed the feeder via a ramp 12. Licking is measured at the lickometer with, e.g., a 1 msec resolution by a change in capacitance in the licking spout when the animal licked to obtain water. In certain embodiments, the feeder and lickometer are on the same side of the cage. Movement can be measured on the activity platform by a load beam detector capable of detecting movement of greater than 1 cm with 20 msec resolution.
Figure 2:
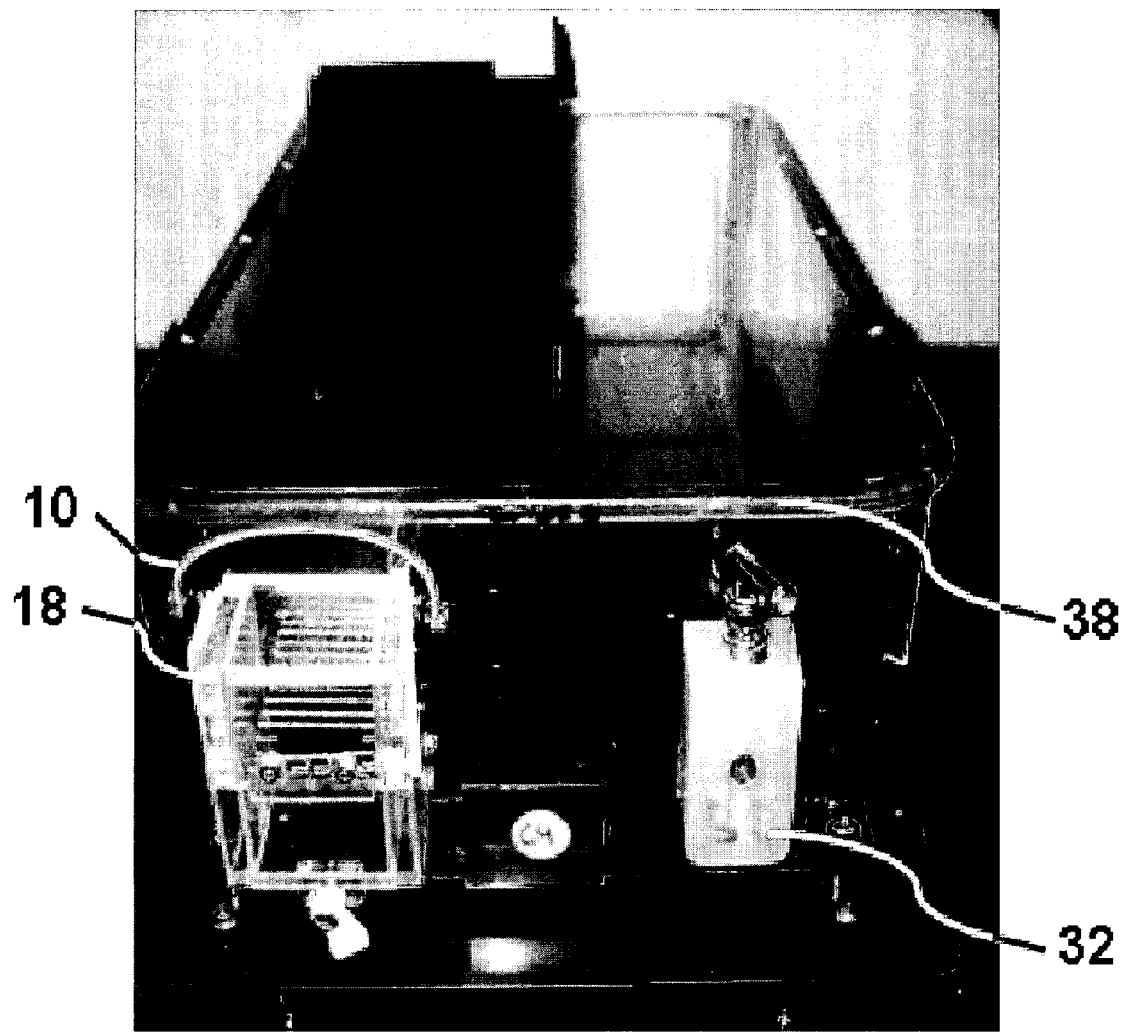
FIG. 2 shows a photograph of a behavior analysis system 40.

In certain embodiments, test animals (e.g. mice, rats, rabbits, guineae pigs, etc.) in cages equipped with a feeding monitor, a lickometer, and an activity detection platform (see, e.g., FIGS. 1 and 2). To determine food and fluid intake, feeding and licking coefficients (FC, LC) are calculated by dividing total consumption by the total photobeam break (PBB) time and lick contact duration (LCD). Multiplication of the FC by individual PBB times then yields the instantaneous food consumption while multiplication of the LC by LCD yields the instantaneous water consumption. We have validated this approach, observing tight correlations between measured intakes and PBB and LCD times.

This system has been used to characterize home cage behavioral patterns in C57BL/6J, hyperphagic ob/ob (26) and 5-HT2CR null mutant mice (27, 28). Inspection of a record from a C57BL/6J mouse reveals that feeding is episodic, closely associated with both water consumption and movement, and expressed in a diurnal pattern. Examination of a record from an ob/ob mouse reveals less frequent, but more intense episodes of ingestive behavior, consistent with impairment in satiation processes. In addition, a marked decrease in movement is apparent; a factor likely to contribute to the enhanced adiposity of ob/ob mice. Interestingly, the pattern of hyperphagia in 5-HT2CR mutant mice differs from that of ob/ob mice, characterized by increased frequencies of ingestive bouts, raising the possibility that the regulation of hunger (processes leading to feeding initiation) is perturbed in these animals.

We have demonstrated that home cage behavior for mice is organized and sensitive to mutations that influence neural function. Detailed analysis of behavioral organization provides a highly sensitive readout of the influences of genetic, pharmacological and environmental manipulations on CNS function.

We have developed quantitative ethological approaches to understand the organization of behavior in the mouse. The development of these basic techniques provides a means to determine patterns of alcohol ingestion, or ingesion of other compounds, in a broad behavioral context, and to examine how this ingestion affects behavioral organization, and by extension, brain function.

Episodes of ingestive behavior are characterized by complex clusters of eating and drinking bouts interspersed with locomotion and other behaviors (29–31). To perform pattern analysis of consummatory behaviors, objective criteria are developed for defining these bouts and clusters. Toward this end, we have used maximum likelihood estimation to fit a log-normal model to the frequency distribution of intervals between feeding events (31–33). An example of the distribution of the inter-event-intervals for feeding for an individual mouse reveal that a best fit for the feeding events utilizes five gaussians. Our movement data indicate that mice do not leave the feeder during the brief intervals comprising the first three distributions of the feeding event data. Intervals between 24 seconds and 18 minutes fall within the fourth distribution, and constitute intervals between bouts of feeding. Frequently, these intervals correspond to visits to the licking spout during which drinking episodes ensue. The longest pauses of greater than 18 minutes define intervals between clusters of feeding and drinking bouts (FIG. 3C) and frequently corresponds to visits to the nest. A similar approach may be used to uncover structure in and locomotor behavior to provide information relating to the size, duration, frequency and diurnal distribution of bouts and clusters of behavior.

Another important organizing feature of home cage behavior is the nest. Wild mice establish nests to which they repeatedly return after excursions into their home range (34, 35). Our preliminary data indicate that singly housed laboratory mice use the nest as a home base in a similar manner. The longest pauses between movements cluster in one area of each cage that corresponds to the nest (FIG. 4A). We examine individual excursions from this location by defining nest-to-nest loops which describe the location of the mouse and its behavior during a round-trip from the nest and back. We observe that these trips frequently correspond with visits to the feeder and the water bottle where feeding and drinking bouts ensue.

This invention provides quantitative behavioral analysis techniques to define patterns of movement that provide sensitive indicator(s) of ethanol intoxication or the influence of other psychoactive chemicals. Ethological studies have described multiple activity states, including full stop, lingering, walking, turning and running (35, 36). We have used a method similar to that described by Drai et al to define states of movement that we predict will correspond to running, walking or turning, moving in place, and full arrest. The example of a nest-to-nest excursion reveals a pattern we commonly observe, in which velocity of movement away from the nest is less than the velocity exhibited during the return trip.

5-HTR Mutant Lines.

Consistent with a contribution of 5-HT2CRs to the tonic serotonergic inhibition of mesolimbic dopamine system function, 5-HT2CR mutant mice display elevated extracellular DA levels in the nucleus accumbens, as determined using a no-net flux in vivo microdialysis procedure. Several lines of evidence suggest an association of mesoaccumbens DA projection hyperactivity with disinhibited exploration of environmental novelty (37, 38). Accordingly, 5-HT2CR mutants exhibit disinhibited exploration of a moderately aversive mirrored chamber and elevated locomotor activity in a novel open field. Enhanced responses to novelty have been associated with increased sensitivity to the locomotor and reinforcing effects of psychostimulants (39). Accordingly, 5-HT2CR mutants exhibit increased locomotor responses to cocaine (FIG. 5D) and will lever press at twice the rate of wild type mice for IV cocaine infusions in an operant progressive ratio task. In view of these studies, we predict that 5-HT2CR activation opposes the reinforcing properties of ethanol.

Consistent with an inhibitory role of 5-HT1A somatodendritic autoreceptors on brain serotonergic activity, 5-HT1AR mutants exhibit global elevations of extracellular serotonin levels (40). Consistent with Cloninger's model relating hyperserotonergic states to anxiety, these animals also display a profound anxiogenic phenotype (41).

Unlike the 5-HT2CR and 5-HT1AR mutant lines, no overt baseline behavioral abnormalities were detectable in 5-HT6 null mutants. However, these animals display markedly abnormal responses to acute ethanol administration, characterized by reduced ataxic (rotorod assay) and sedative (loss of righting reflex) effects, and enhanced locomotor stimulation. These mutants overconsume ethanol solutions in chronic intake studies, achieving elevated blood ethanol levels. Neural mechanisms underlying this phenotype are unclear; the relatively high levels of 5-HT6R expression in the nucleus accumbens (23, 24) provides a focus for further study.

Example 2

Introduction

The production of behavior by an animal does not occur randomly in time nor space, but is instead organized in the context of the environment to improve the fitness and thus the survival of the animal (Machlis (1997) *Behaviour* 63: 1–70). As a result of this organization, discernable and coherent patterns of behavior should be detectable, however the continual production of behavior by an animal in the natural or laboratory environment produces a vast amount of information. The challenge therefore is not only to develop the technology to obtain the behavioral data, but also to develop analytical techniques that reduce the information contained in this behavioral data to a succinct and informative summary. Because of the role of evolutionary selection in behavioral adaptation (Tinbergen (1963) 20: 89–94), there should be a substantial genetic contribution to the central nervous system structures that produce behavioral patterns. A detailed description and quantification of such behavioral patterns should therefore elucidate the genetic and neurophysiological mechanisms that regulate the generation of behavior. As a step in developing automated high-throughput techniques for the collection and analysis of behavioral patterns, a home cage behavioral monitoring system for mice that captures with high temporal and spatial resolution the feeding, drinking, and locomotion of an animal has been developed.

Mice are good experimental subjects for these studies because of the sequencing of their genome, the availability of inbred strains and spontaneous mutations, as well as the increasing ability to manipulate their genetics. The rationale for examining feeding, drinking, and locomotion results from the prediction that activities essential for survival can be expected to strongly influence the organization of behavior. The maintenance of energy balance is essential for survival, and depends on the regulation of energy intake through alterations in feeding and drinking behavior and on energy expenditure, which is affected behaviorally by levels of physical activity. The role of feeding, drinking, and physical activity levels in the maintenance of energy balance thus suggests that these behaviors should be highly organized in time and space. In addition, the availability of mutations producing obesity provides an excellent opportunity to evaluate the impact of alterations in energy balance on behavioral patterns.

Three mutations (obese, agouti, and 5HT2c receptor) that disrupt the regulation of energy balance and lead to obesity via alterations in leptin, melanocortin, and serotonergic systems (Pellymounter et al. (1995) *Science* 269: 540–543; Fan et al. (1997) *Nature* 385: 119–120; Tecott et al. (1995) *Nature* 374: 542–546) have been investigated using the home cage behavioral monitoring system. Of these, the obese mutation results in marked obesity due to the loss of function of the hormone leptin that is expressed primarily in adipose tissue and acts at receptors in the ventrobasal hypothalamus as well as other sites (Boston et al. (1997) *Science* 278: 1641–1644; Schwartz et al. (1996) *Journal of Clinical Investigation* 96: 1101–1106). In the absence of leptin, obese mice increase feeding and decrease activity (Pellymounter et al. (1995) *Science* 269: 540–543). In addition, they are hyperglycemic, hyperinsulinemic, hypothermic, and have an overall decrease in metabolic rate (Friedman and Halaas (1998) *Nature* 395: 763–770), which contributes to the profound obesity seen in obese mice. The agouti mutation also produces marked obesity but results from ectopic expression of the agouti protein that acts as an antagonist at the melanocortin type 3 and 4 receptors (Miller et al. (1993) *Genes and Development* 7: 454–467; Ollman et al. (1997) *Science* 278: 135–138). These receptors are highly expressed in the paraventricular and dorsomedial hypothalamic nucleus and in the lateral hypothalamic area (Kim et al. (2000) *Diabetes* 49: 177–182). Obesity in double mutant agoutilobese mice has been shown to be independent and additive suggesting that the mechanism leading to obesity in agouti mice is distinct from that leading to obesity in obese mice (Boston et al. (1997) *Science* 278: 1641–1644). Finally, the engineered null mutation of the serotonin 2c (5HT2C) receptor results in mild late onset obesity, accompanied by development of type II diabetes. The 5HT2C receptor is widely expressed in the central nervous system but has high levels of expression in the arcuate nucleus of the hypothalamus and the nucleus accumbens. While all three mutations lead to increased food intake and obesity, the mechanisms leading to obesity appear to be distinct, suggesting that the alterations in ingestive behavior and physical activity levels produced by these mutations may also be distinct. Analysis of patterns of feeding, drinking, and physical activity combined with comparison of patterns between different obese mutants thus provides a means to assess the utility and adequacy of the description of behavioral patterns.

In order to identify patterns of behavior exhibited by an animal, it is first useful to reduce the observation of the continuous flow of behavior into simple behavioral units. A common unit used to measure behavior in ethology is the bout, which is defined as the repeated occurrence of the same behavioral act clustered together in time (Machlis (1997) *Behaviour* 63: 1–70). The underlying notion behind this definition is that the animal should be engaged in a single behavior during a bout (e.g. feeding) and that termination of this behavior should be separated by the animal engaging in other distinct behaviors (e.g. drinking, movement, or inactivity). In addition, individual behavioral acts within a bout, such as repeatedly grasping food with the paw and bringing it to the mouth, are separated by short within-bout intervals (WBIs) that are distinct in duration from the longer intervals that separate bouts. It is the existence of both short WBIs and longer inter-bout intervals (IBIs) that produces the clustering in time that is characteristic of a bout, thus if bouts of behavior are present, it should be possible to demonstrate that at least two types of inter-event intervals are present separating the repetition of a behavior. This can be done by fitting a mixture of probability density distributions to a large set of inter-event intervals using maximum likelihood estimation to assess the presence of distinct types of inter-event intervals (Tolkamp et al. (1998) *Journal of Theoretical Biology* 194: 235–250). If the frequency of inter-event intervals is better fit by a mixture of two distributions this indicates that two distinct durations of intervals are present and supports the proposal that the behavior is organized into bouts. In addition, the fit to the data can also be used to determine a bout criteria—the maximum duration of time that an animal can pause between the repeated behavioral acts before the bout is considered to have ended. This criterion can then be used to identify the bouts of behavior and thus classify the continuous stream of behavior into behavioral units. The bout is a useful unit of classification because presumably the initiation and termination of bouts is regulated by internal and external cues to which the animal responds.

Two types of mixture distributions (exponential and log normal) have typically been fit to the frequency distribution of inter-event intervals when attempting to identify the presence of a bouts in the production of a behavior. In the past, exponential distributions have frequently been fit to the data, however the use of exponentials requires the assumption that the probability of initiating a feeding event is independent of the time since the last feeding event. Furthermore, the use of exponentials implies that the probability of initiating feeding is highest directly after a bout, and decreases exponentially thereafter. This is not consistent with the idea of satiety, which would suggest that the animal has a low probability of initiating feeding immediately following a bout of feeding. Tolkamp and Kyriazakis (1999) *Animal Behaviour* 57: 807–817, have proposed fitting the inter-event intervals with log normal distributions, which means that the probability of initiating feeding following a bout is low and increases with time until reaching the mode of the log normal distribution. This model is therefore a more meaningful model as it is consistent with the concept of satiety.

In addition to identifying the occurrence of bouts in feeding behavior, these types of analysis also revealed that bouts of feeding may themselves be clustered together in time indicating that a higher level of organization is present (i.e. clusters of bouts). The presence of clusters of bouts is indicated when the frequency distribution of inter-event intervals is best fit by a mixture of three distributions. This corresponds to the presence of short duration WBIs, intermediate duration IBIs, and longer duration inter-cluster intervals (ICIs). These clusters are often called meals, and variation in the properties of the clusters, such as their duration and the quantity of food consumed during the cluster, is related to biologically phenomena such as satiety/hunger and satiation.

As a first step in examining the patterns of feeding behavior in the obese mutants examined in these experiments, log normal distributions are fit to the intervals between feeding acts to assess for the presence of bouts and clusters. The properties of these bouts and clusters are then compared across genotypes to examine how these mutations alter the ingestive behavior patterns of these obese mutant mice. The role of circadian and ultradian rhythms in determining the patterns of ingestion is also examined.

Methods

Animals

In experiments involving 5HT2C receptor mutant mice, hemizygous mutant males bearing a null mutation of the X-linked htr2c gene (congenic on a C57BL6J background) were used with littermate wild types (WT) as controls. This line has been maintained by mating females heterozygous for the htr2c gene with C57BL6J males (Jackson Laboratories, Bar Harbor, Me.) and has been genotyped as previously reported (Tecott et al. (1995) *Nature* 374: 542–546). In experiments involving obese mice, homozygous mutant mice (B6.V-Lep$^{ob}$, Jackson Laboratories, Bar Harbor, Me.) were used with WT mice from the Jackson Laboratory C57BL/6J stock as controls. In experiments using agouti mice, heterozygous mutant mice (B6.Cg-A$^y$, Jackson Laboratories, Bar Harbor, Me.) were used with WT from the Jackson Laboratory B6.Cg-A$^y$ stock as controls. All mice were two-three months of age when the studies began. Animals were always maintained on a 12-hour light/dark cycle (lights off at 1900 h) and were given free access to water and standard chow diet (PicoLab Mouse Diet 20; Purina Mills, Richmond, Ind.). The average body weights of Ob (57.0 g±3.3) and Ay (40.2 g±0.9) mice during the course of the experiment differed significantly (p<0.001; p<0.001) from those of their wild types (28.1g±1.9). The average body weights of 5HT2CR mutant mice were not significantly different than those of their wild type controls. Animals were used and cared for according to the University of California, San Francisco laboratory animal research guidelines.

Data Collection

Figure 17:
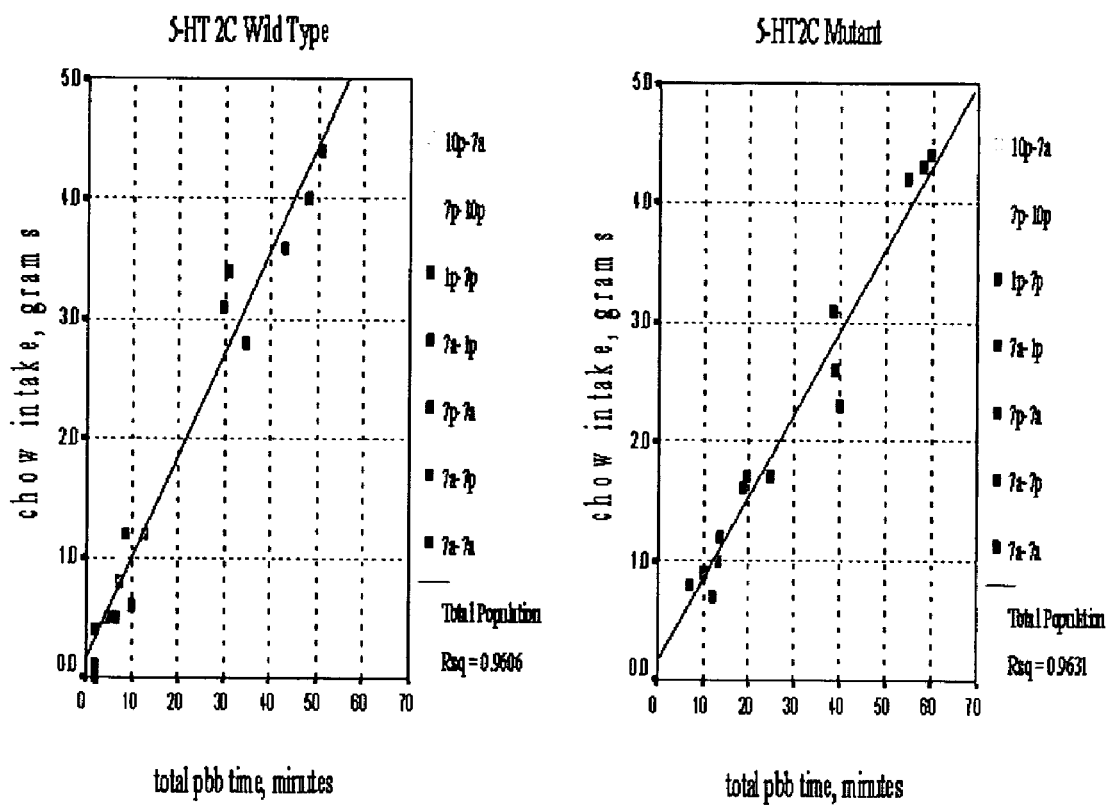
FIG. 17 shows correlations of intake with device measures. Left plot: Photobeam break time was highly correlated with chow intake measured in grams for wild type ($R^2=0.9606$) and 2C mice ($R^2=0.9631$). Right plot: Lick contact number was highly correlated with water intake measured in grams for wild type ($R^2=0.9602$) and 2C mice ($R^2=0.9845$). Measurements were done for 3, 6, 9, 12, and 24 hour periods and across time of day.

During each experiment, mice were singly housed in 20 cm by 50 cm cages with Cell Sorb Plus Litter Bedding (Fangman Specialties Inc., Cinncinati, Ohio) and a bedding square. Cages were mounted on a load beam platform (DiLog Instruments, Tallahassee, Fla.) that detected movement of the animal's center of gravity greater than 1 cm with a 20 ms temporal resolution. Each cage had a feeder and a licking bottle (DiLog Instruments, Tallahassee, Fla.) attached to one end (see, e.g., FIG. 1). The feeder allowed access to a powered version of the standard chow (PicoLab Mouse Diet 20; Purina Mills, Richmond, Ind.) through a hole in the wire mesh ramp leading into the feeder. Feeding was detected when an animal broke an infrared photobeam mounted just below the hole in the feeder ramp. Drinking was detected as a change in capacitance when an animal licked at the lick spout of the water bottle. The temporal resolution of the photobeam break and lick contact measurements was 1 ms. The validity of using photobeam break time and lick contact number as a measure of food and water intake was assessed by measuring food and water intake after varying periods of time (3, 6, 9, 12, and 24 hours). Total intake and the device measures of feeding and licking were highly correlated for wild type ($R^2=0.9606$; $R^2=0.9602$) and 5HT2CR ($R^2=0.9631$; $R^2=0.9845$) mutant mice across all times of day (FIG. 17). Photobeam beak time and lick contact number thus provide a reasonable measure of food and water intake.

Mice were run in groups of 16 with 8 mutants (either 5HT2CR null, obese, or agouti) and 8 controls (2 5HT2CR rounds, 1 Ob round, and 1 Ay round). An additional round of 9 Ob mice was run with heterozygote controls which were excluded from analysis due to their partial phenotype compared with wild type controls. Each round lasted 14 days consisting of 4 days for habituation and 10 days for data collection. Data was collected continuously from the devices except during daily maintenance during which food and water were removed and replaced with fresh food and water. Food and water were weighted before and after removal to measure total intake for the duration of data collection. At the end of one round using 5HT2CR mutants and wild types, correlation tests were done to assess the validity of the devices for measuring intake as described above.

Data Analysis

Quality Control

The accuracy of the device measurements was assessed at the end of each round to determine if errors in measurement were present. The most problematic error in data collection stemmed from the powdered food either piling up or sticking to the photobeam LED or IR detector resulting in prolonged photobeam breaks unrelated to feeding. In order to exclude these erroneous photobeam breaks, the photobeam break data was binned into 30 second bins and all bins that had 30 seconds of continuous beam break time and at least one centimeter of locomotion were combined and the frequency of movement was fit with two exponentials. A criterion was then set as the intersection between the two exponentials. It was assumed that movement less than the criterion resulted from movement in the feeder during the photobeam break and that movement greater than the criterion resulted from movement around the cage during an erroneous photobeam break. Therefore if an animal moved more than the criterion (9–11 cm depending on the round) during a 30 second bin of continuous beam break time, the entire day of data for that animal was excluded. This technique appears effective since all data containing a simultaneous photobeam break and lick contact were detected and removed from the data set. An additional problem occurred more rarely and resulted when an animal slept in the feeder. This was first determined by visually assessing the feeding records for abnormal amounts of photobeam break time and then observing the animal in the day. The entire day of data was excluded if the animal was observed to sleep in the feeder. Additionally, one day of data for an entire round of Ob mice was lost due to a temperature malfunction that caused a prolonged temperature fluctuation to 85° F. Finally, an animal was completely dropped from analysis if, as a result of the exclusions, it had four or fewer days of data available for analysis.

Estimation of Intake

Intake for any given time duration less than that measured directly was calculated using feeding and licking coefficients. The feeding coefficient (mg/s) was calculated by dividing the total intake for the duration of data collection (usually about 22 hours) by the total photobeam break time for the duration. The licking coefficient (mg/lick) was calculated by dividing the total intake for the duration of data collection by the total lick contact number for the duration. Multiplying the feeding coefficient by the total photobeam break time (secs.) during the duration of interest (e.g. dark or light cycle) then yields an estimate of the quantity of food consumed during that duration. A similar calculation yields an estimate of the quantity of water consumed.

Bout and Cluster Analysis

All photobeam break gaps (intervals between photobeam breaks) were compiled for each animal for the last 10 days of data collection. Due to obvious differences in the patterns of the gaps between the light and dark cycle, the gaps for the dark and light cycle for each animal were examined separately. The distribution of the dark and light cycle log-transformed gaps for each animal were then individually fit with one to nine log normal distributions by minimizing the deviance (deviance=$-2*\lambda(\theta)$) of the log-likelihood ($\lambda(\theta)$, below) for a mixture of log normal distributions using the modified Newton-Raphson method in GENSTAT:

$$\lambda(\theta)=\Sigma_{i=1-N}\Sigma_{j=1-M}(\ln(p_j*\exp(-(t-\mu_j)^2/(2*\sigma_j^2))/(2\pi\sigma_j^2)^{1/2}$$

where $p_j$ is the proportion of intervals in distribution j, $\mu_j$ is the mean of distribution j, $\sigma_j$ is the standard deviation of distribution j, t is the log(interval duration), with interval duration in milliseconds, N is the number of intervals, and M is the number of distributions.

The number of distributions fit to the data was increased until the maximum likelihood ratio, $LR=2*(\lambda(\theta_1)-\lambda(\theta_2))$, fell below 15. The last fit with a ratio above 15 was deemed significant and accepted as the final fit.

The distribution with the longest mean interval duration was the distribution of inter-cluster intervals (ICI). The distribution with the second longest mean interval duration was the distribution of inter-bout intervals (IBI). The remaining distributions, with the shortest mean interval durations, were collectively termed the distributions of within-bout intervals (WBI). The criteria for assignment of interval type were determined by the intersections of distributions. The cluster criterion was calculated as the intersection between the IBI distribution and the ICI distribution. Intervals with duration longer than the cluster criterion were labeled ICIs. The bout criterion was calculated as the intersection of the IBI with the adjacent intersecting WBI, which is not always the next shortest duration due to variation in the standard deviations. Intervals with a duration longer than the bout criterion but shorter than the cluster criterion were IBIs and those with duration shorter than the bout criterion were labeled WBIs. Separate bout and cluster criterion were calculated for the dark and light cycle.

Some exceptions to this method of classifying the gaps were made to provide for consistent comparison across animals. For some animals (n=2, 2C, light cycle), in the region where the IBI distribution was typically found (~0.5–2 minutes), there were two distributions. This suggests, that for these animals, there were two types of IBI or that the IBI changed over the 10 days of data collection. In this case, the bout criterion was recalculated at the intersection of the shorter IBI and the adjacent intersecting WBI. Animals were also said to have no cluster criteria if the highest duration intersection of curves was below 5 minutes (n=5, 2C, dark cycle). These animals either lacked clusters during the dark cycle or there were too few ICIs during the dark cycle and the ICI was therefore not detected. However, even if there were no clusters during the dark cycle, all of these animals did exhibit an ICI distribution during the light cycle. The dark cycle could thus be considered as a single large cluster separated from clusters occurring during the light cycle by the light cycle ICIs. A criterion of 720 minutes (12 hours of the dark cycle) was therefore compared with a criterion yielded by averaging the criteria of animals of the same genotype. The criterion of 720 minutes would be consistent with no distinct clusters appearing during the dark cycle, while the application of an average criterion from other mice of the same genotype is consistent with too few ICIs being present for detection. Inspection of the data revealed that application of the averaged criterion identified clusters that seemed consistent with those estimated by visual inspection. It thus seemed more likely that for these animals cluster did occur during the dark cycle but that there were too few ICIs to be detected. Therefore, an averaged criterion was used for animals without cluster criteria.

After the interval types were assigned, the photobeam events themselves were assigned as belonging to bouts or clusters, depending on which types of intervals surrounded them. This assignment was done for all photobeam breaks using Visual Basic for applications in Microsoft Excel. For analysis, bouts and clusters were then separated into active and inactive phases, because clusters sometimes crossed the boundary of the dark-light cycle. Clusters that began in the light cycle but ended in the dark cycle or began in the dark cycle but ended in the light cycle were assigned to the active phase (largely dark cycle). Clusters that occurred solely within the light cycle were assigned to the inactive phase (light cycle).

Time Series Analysis

Total intake during 6 minute bins was calculated for 10 days of data. The Lomb-Scargle algorithm was used to generate a periodogram for each animal and significant peaks from each periodogram were used to generate a waveform. The divergence between periodograms was measured using the Kullback-Leibler measure of distance and the periodograms were clustered based on these distances using the Ward hierarchical clustering technique.

Statistical Analysis

Total food and water intake and total movement in the light and dark cycles were compared using repeated measures ANOVA. Cluster properties, including cluster size (grams), number of clusters, and inter-cluster interval, were compared using repeated measures ANOVA. Statistical tests were run separately for 2C, Ob, and Ay mice and mutants were compared to the control WT mice for each group.

Results

Alterations in Diurnal Patterns of Ingestive Behavior and Activity

Figure 18A:
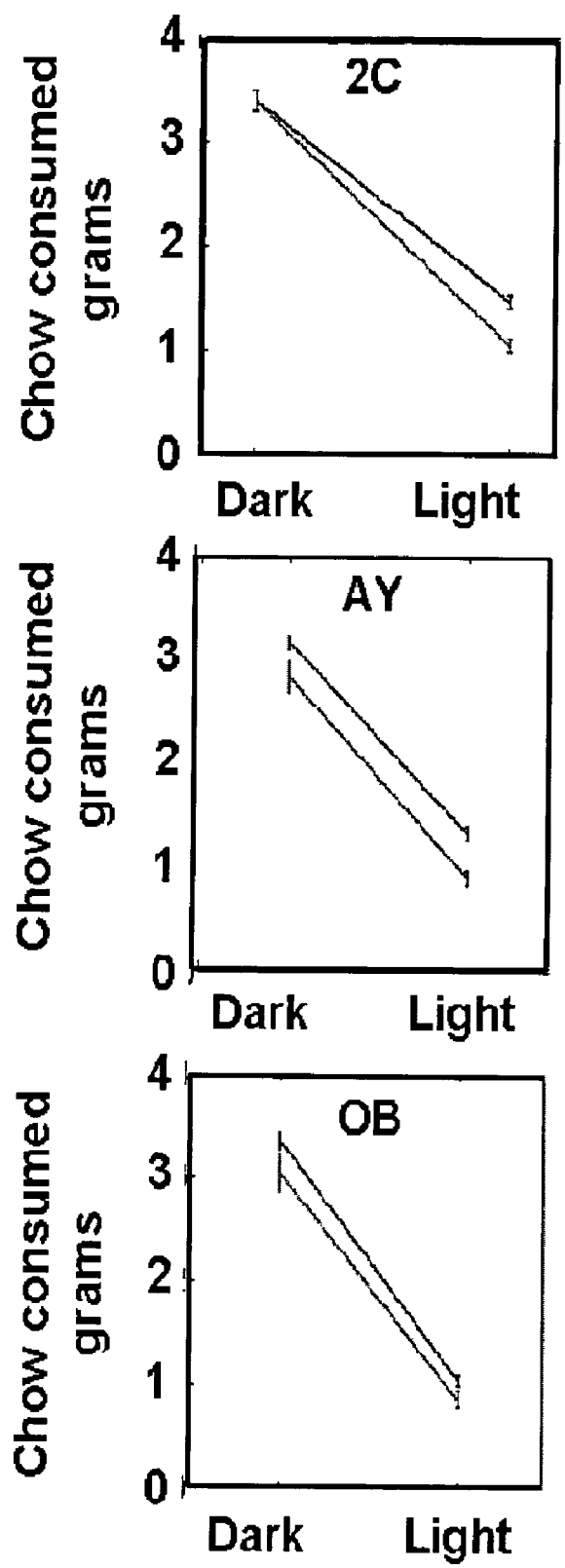
FIGS. 18A, 18B, and 18C show total consumption and movement in the light and dark cycles. Chow and water intake and amount of movement in the light and dark cycles were analyzed using repeated measures ANOVA to allow for comparisons of the effects of genotype, cycle, and cycle by genotype interactions.
Figure 18B:
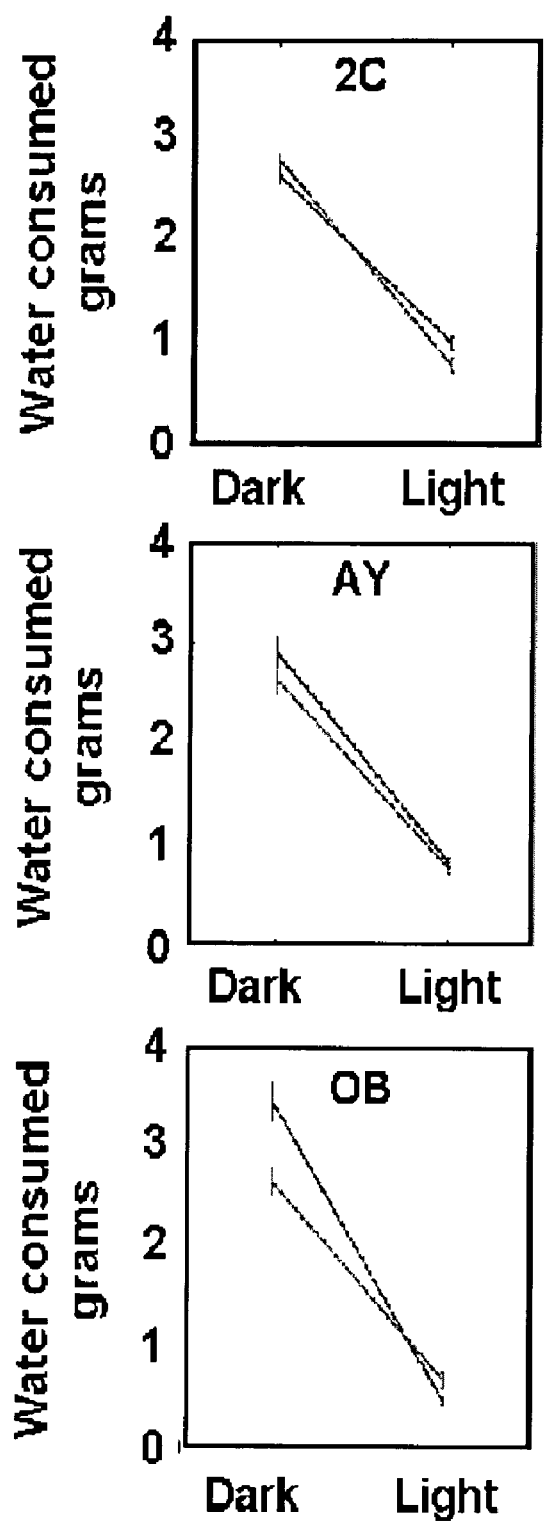
Figure 18C:
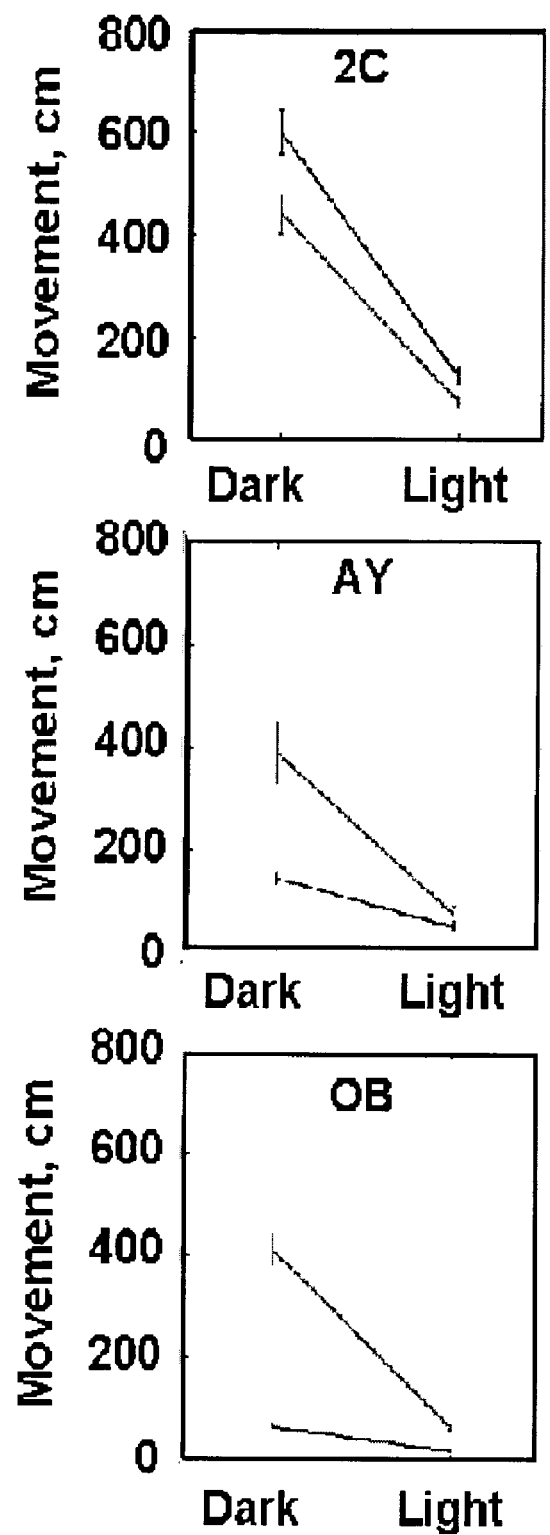

Because mice are known to be nocturnal, differences in the temporal organization of behavior between the dark and light cycles were expected. Therefore, total food and water consumption as well as movement in the dark and light cycles were first examined. Not surprisingly for all groups of animals, there was a significant effect of cycle for food and water consumption as well as for movement (FIG. 18) with more feeding, drinking, and movement occurring during the dark cycle than during the light cycle.

Figure 3:
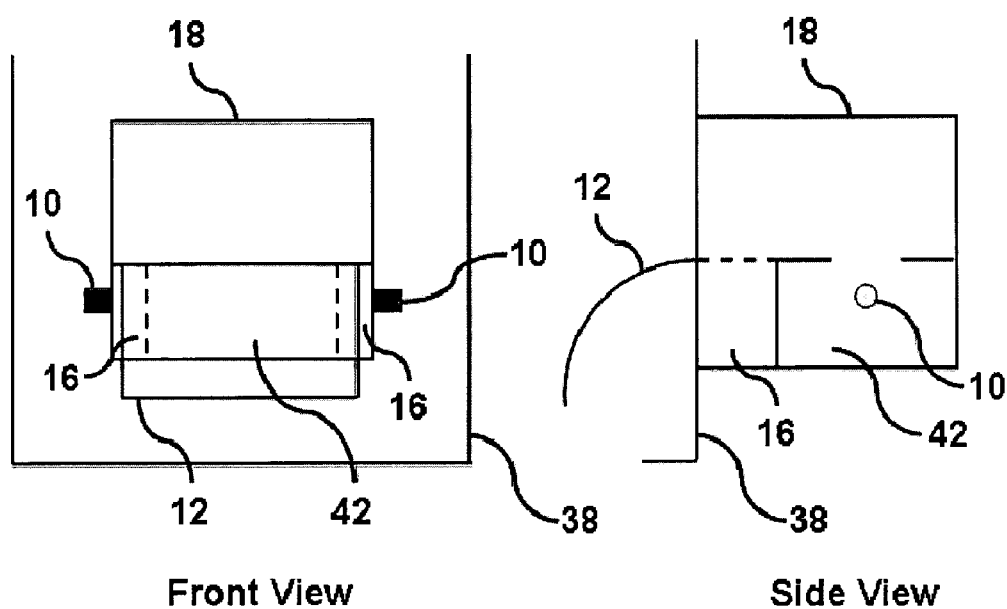
FIG. 3 shows a schematic illustration of the feeder 18 showing the entrance ramp 12, the detector 10 (e.g. photobeam), the feed bin 42, and the overflow trough 16.
Figure 4A:
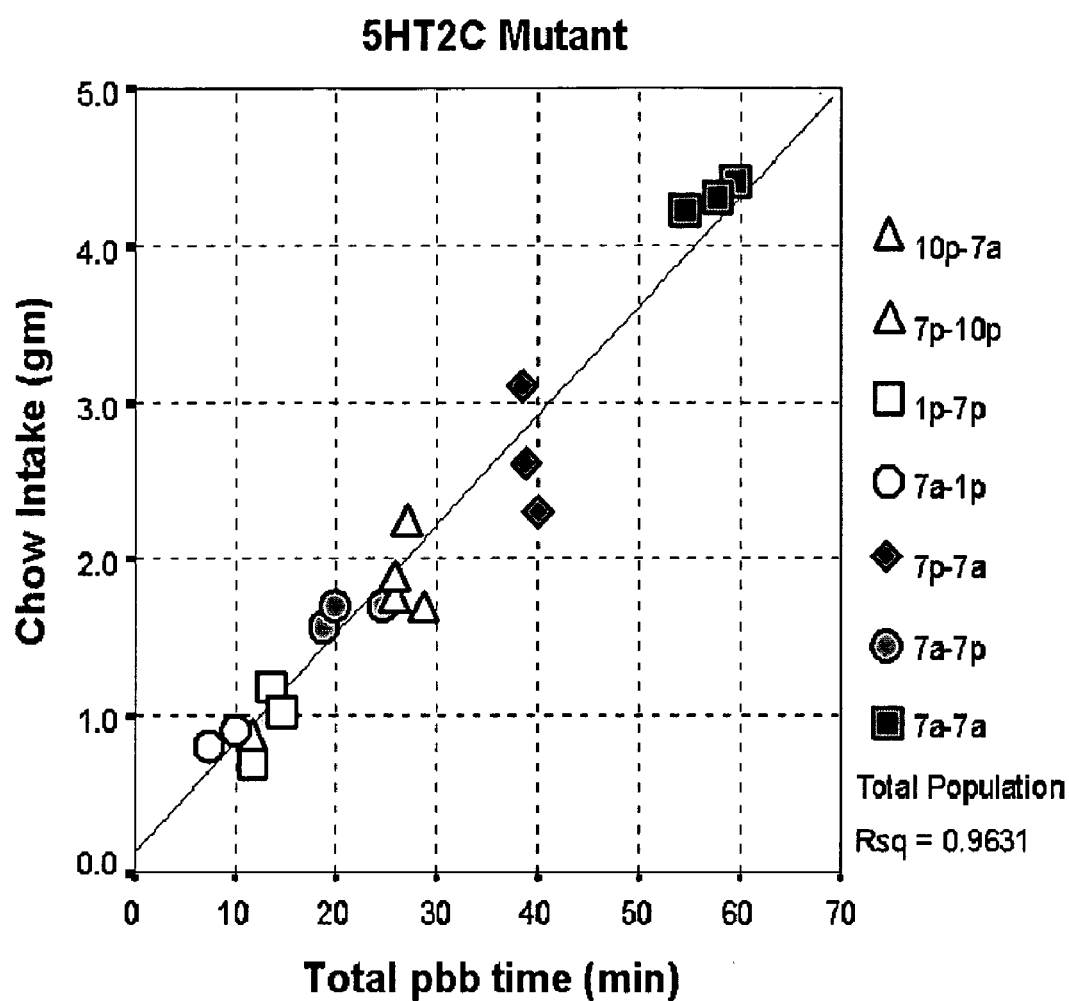
FIGS. 4A and 4B show the correlation of chow intake with beam break time for 5-HT 2C mutant (knockout mice (FIG. 4A), and for wild type mice (FIG. 4B).
Figure 4B:
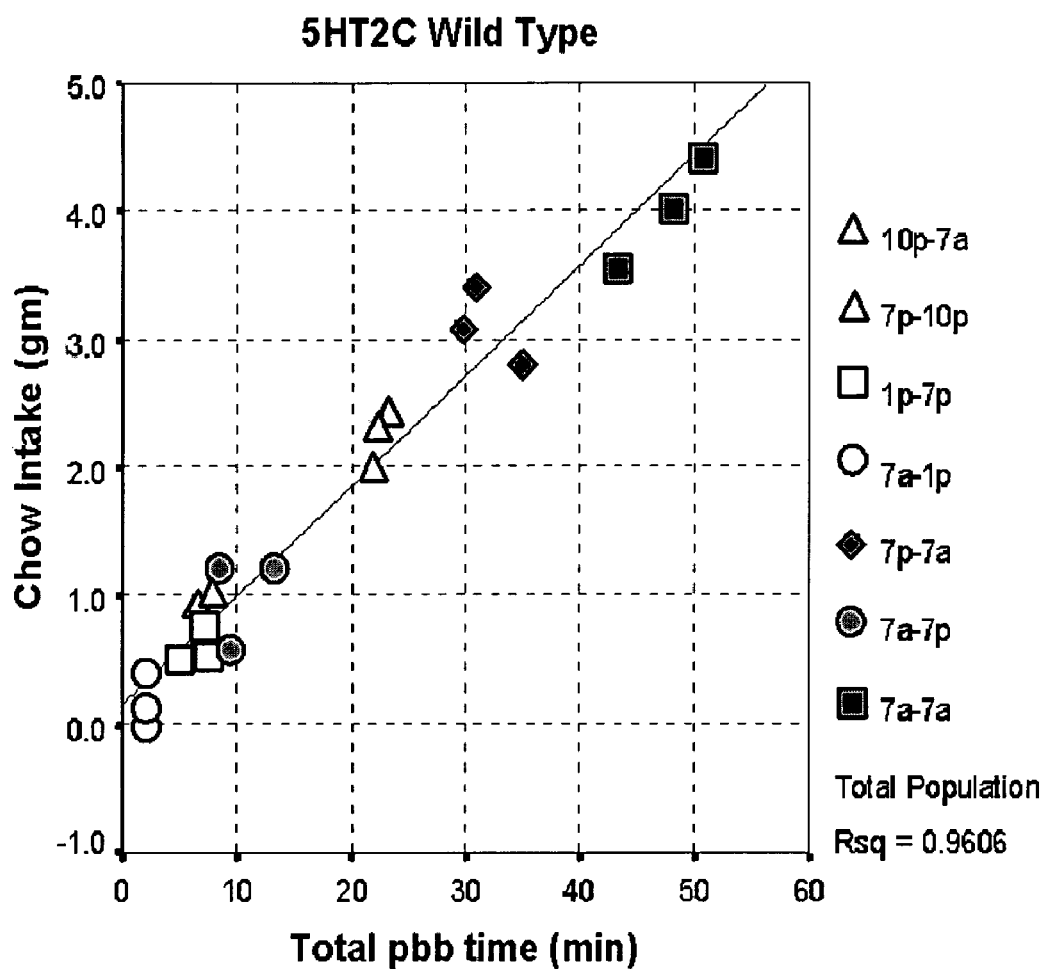

Comparison of each obese mutant group (2C, Ob, Ay) with their wild type controls revealed a significant effect of genotype for food consumption with all of the obese mutants consuming more food than their wild type controls (FIG. 3). In addition, comparison of 2C mutants and WT mice also revealed a cycle by genotype interaction for food consumption, and surprisingly this interaction appears to be the result of the 2C mutants only consuming more food than their wild type controls during the light cycle (FIG. 3). This is in contrast to the Ob and Ay mutants where the interactions of cycle and genotype are not significant, indicating that the increased intake by the mutants relative to their wild type controls is similar in both the light and dark cycles.

In contrast to food consumption, there was no significant effect of genotype for water consumption for any of the mutant groups compared with their wild type controls. However, 2C and Ob mutants exhibited significant cycle by genotype interactions. The 2C mutants exhibited a smaller decrease in water consumption from the dark cycle to the light cycle relative to their wild type controls. In contrast, the Ob mutants exhibited a larger decrease in water consumption from the dark cycle to the light cycle relative to their wild type controls.

Examination of the quantity of movement revealed a significant effect of genotype for each mutant group compared with their wild type controls. The 2C mutants were hyperactive compared to their WT controls, and also exhibited a significant cycle by genotype interaction, indicating that the decrease in activity going from the dark cycle to the light cycle was greater for 2C mutants. Ob and Ay mutants were hypoactive compared to their respective WT controls, and both exhibited significant cycle by genotype interactions, revealing that the decrease in activity going from the dark to light cycle was less for the Ob and Ay mutants.

Identification of Bouts and Clusters Using Feeding Behavior

Figure 19:
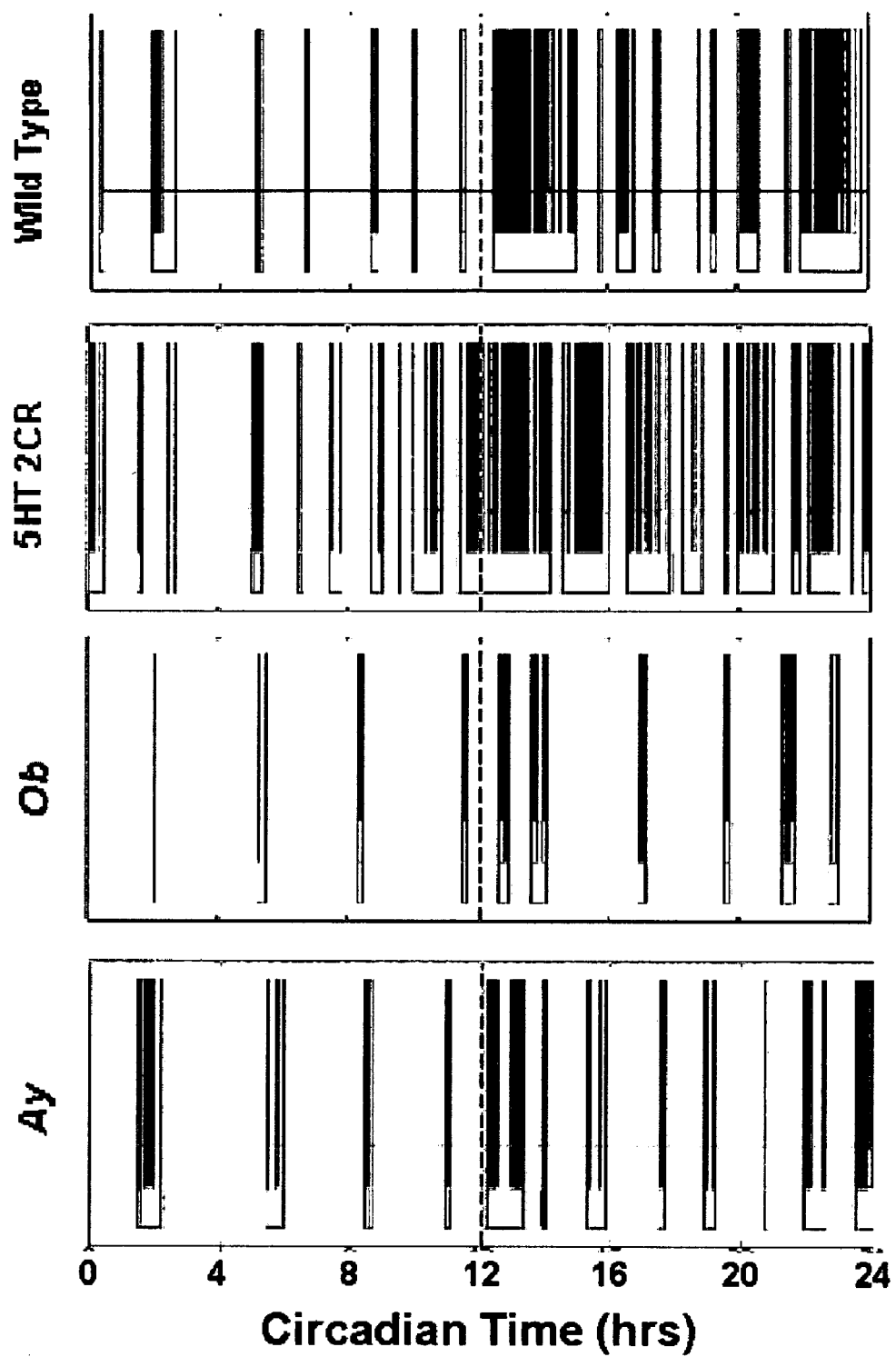
FIG. 19 twenty-four hour feeding pattern for wild type, 5HT2CR, Ob, and Ay mutant mice. The light cycle occurs between hours 0 to 12 and the dark cycle occurs between hours 12 and 24, and a dotted line represents the transition from light to dark cycle. A red line represents each feeding event. Bout and cluster, identified using their respective criteria, are labeled in green and purple respectively.

As seen above, there is clearly a diurnal pattern of ingestive behavior and physical activity that is altered in distinct ways by these different mutations. However, investigation of behavior on this time scale does not provide insights into the changes in the underlying behavioral units governing these alterations in diurnal intake. The examination of feeding behavior at a higher temporal resolution is necessary in order to identify the presence these behavioral units, bouts and clusters of feeding, and to determine their temporal pattern. In order to visualize such patterns, an event record of photobeam breaks, reflecting feeding, is displayed for a single 24-hour period for an animal of each genotype (FIG. 19c). It is readily evident that the photobeam breaks are clustered together in time, and that the properties of these clusters vary both with time of day and with genotype.

Figure 20:
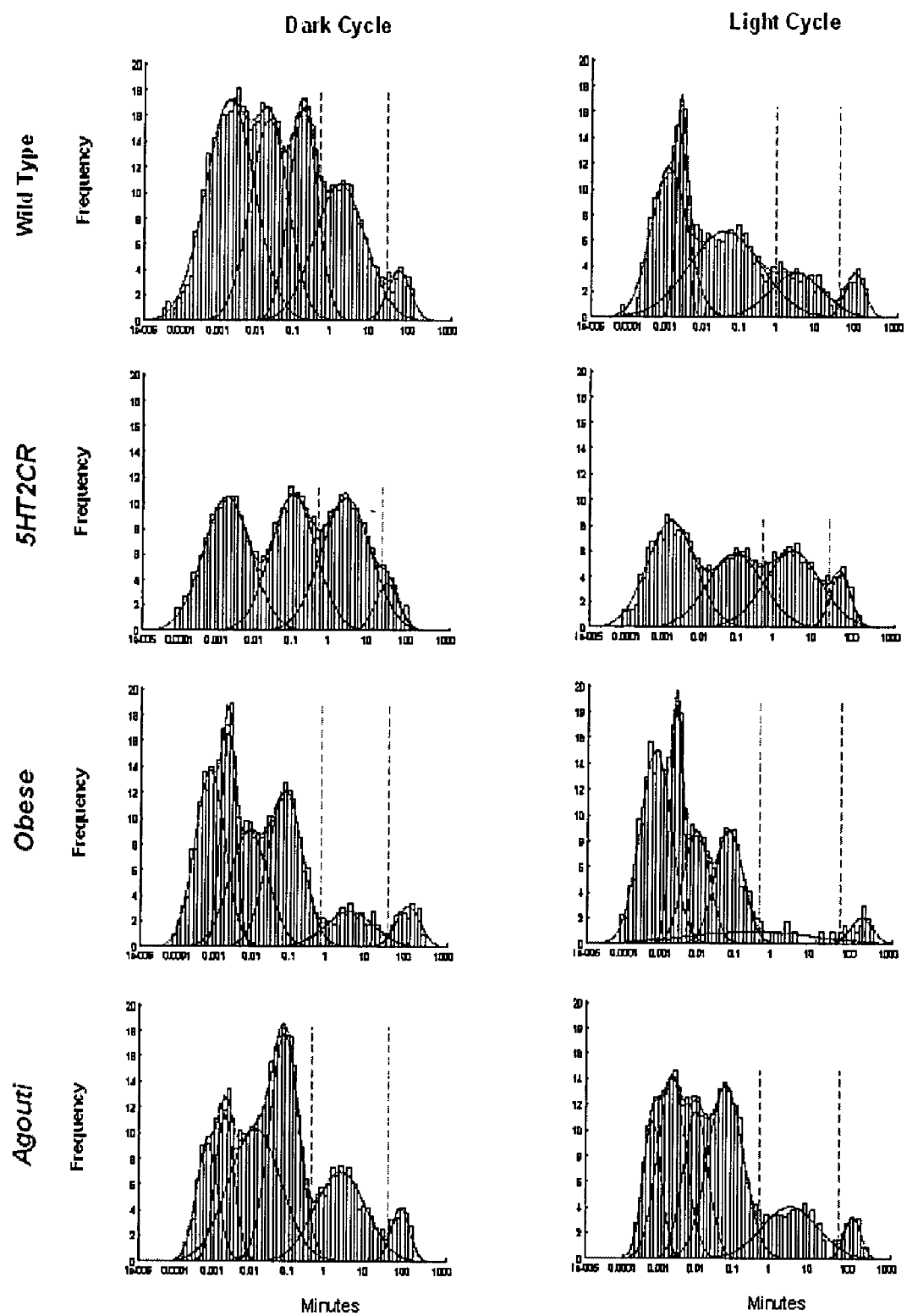
FIG. 20 shows frequency histograms of photo beam break gaps on a scale of log minutes with fitted log normal distributions. Histograms are of single mice with 9 to 10 days of data and are separated by dark and light cycles. Individual log normal distributions are shown in blue and the best fit is shown in red. The intersections of log normal distributions are marked with green dotted lines. The cluster criteria are assigned at the intersection of the last and second to last distributions, and the bout criteria are assigned at the intersection of the second to last and third to last distributions. The intersections of distributions are marked with green dotted lines.
Figure 21:
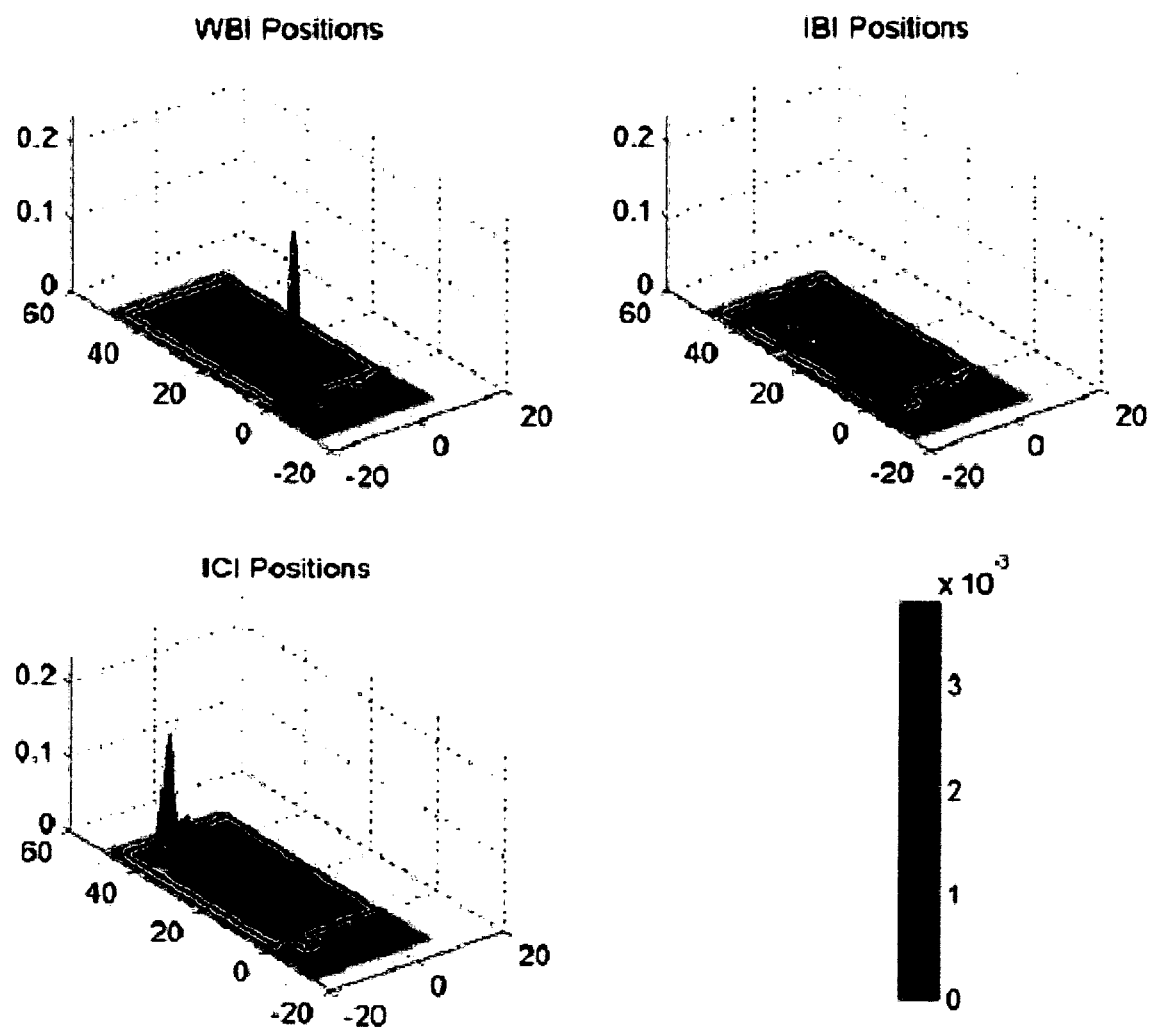
FIG. 21 shows the probability of being in a position during a gap. During within-bout intervals (WBI), animals had the highest probability of being at the feeder. During inter-bout intervals (IBI), animals had equal probabilities of being at the feeder, at the licking spout, and engaged in activity around the cage. During inter-cluster intervals (ICI), animals had the highest probability of being at the nest. The x- and y-axes are measured in cm. The z-axis is the probability of being at a position, with the scale shown on the colorbar. The square represents the feeder and the circle represents the licking spout.

In order to quantify the presence of bouts and clusters of feeding, the gaps between photobeam breaks for individual animals were fit with log-normal distributions for the light and dark cycles (FIG. 20). It is clear from inspection of these frequency histograms that the gaps are best fit by more than two log-normal distributions in all cases. This indicates that there is a temporal structure underlying the generation of the gaps between photobeam breaks, and that the duration of these gaps is neither random nor regular. However, the pattern appears more complex than would be predicted if only bouts and clusters were present, since, if this were the case, only three log-normal distributions would be found: short intervals within bouts, longer intervals between bouts, and very long intervals separating clusters of bouts. Despite the presence of more than three distributions, the intervals have been classified into only three types. The reasoning behind this is that the first several distributions typically exhibit a very short duration, and the animal presumably remains in the feeder engaged in feeding behaviors rather than leaving the feeder and engaging other behaviors. This can be verified by determining the probability of the animal being in a position during these very short pauses, which have been labeled as within-bout intervals (WBIs) (FIG. 21). This reveals that the probability of being at the feeder during the WBIs is much higher than the probability of being at any other location. It may be that the presence of several very short durations less than the bout criteria (DC (mean±sd): WT=0.4 min±0.2 min, =0.4 min±0.2 min, Ob=0.4 min±0.3 min, Ay=0.5 min±0.2 min; LC (mean±sd): WT=0.5 min±0.5 min, 2C=0.7 min±0.5 min, Ob=0.3 min±0.2 min, Ay=0.6 min±0.6 min) reflects different ways in which the animal handles the food while removing it from the feeder resulting in several different types of WBIs.

Two additional distributions were routinely observed, inter-bout intervals (IBIs) and inter-cluster intervals (ICIs). IBIs are defined by being equal to or longer than the bout criteria but shorter than the cluster criteria, and ICIs are defined by being equal to or longer than the cluster criteria (DC: WT=19.5 min±7.9 min, 2C=19.4 min±6.3 min, Ob=35.5 min±17.6 min, Ay=34.9 min±19.5 min; LC: WT=36.2 min±12.7 min, 2C=20.1 min±11.4 min, Ob=36.1 min±21.6 min, Ay=41.7 min±14.9 min). If the IBIs and ICIs are truly distinct, then some feature of the animal's behavior, such as its location, should be different during the IBI as compared with the ICI. This is in fact appears to be the case as seen by examining the animal's probability of being in a position during the IBIs and ICIs. During the IBIs, the probability of the animal being around the feeder, around the licking spout, as well as elsewhere around the cage is roughly equal, and this distribution is markedly different than that observed for the WBIs. This is consistent with the idea that during the IBIs the animal terminates a bout of feeding and engages in other behaviors. During the ICIs, the animal's probability of being at one location in the cage is much higher than being at any other location. This distribution appears distinct from that of the IBIs distribution indicating that during the ICIs and the IBIs the animal engages in distinct behaviors. In fact, daily recording of the animal's nest location reveals that the position of the nest is corresponds with the location in the cage that the animal has the highest probability of being at during the ICIs. This indicates that the bouts are clustered in time and are separated by longer intervals during which the animal is inactive at its nest.

Comparison of Cluster Properties

Figure 22:
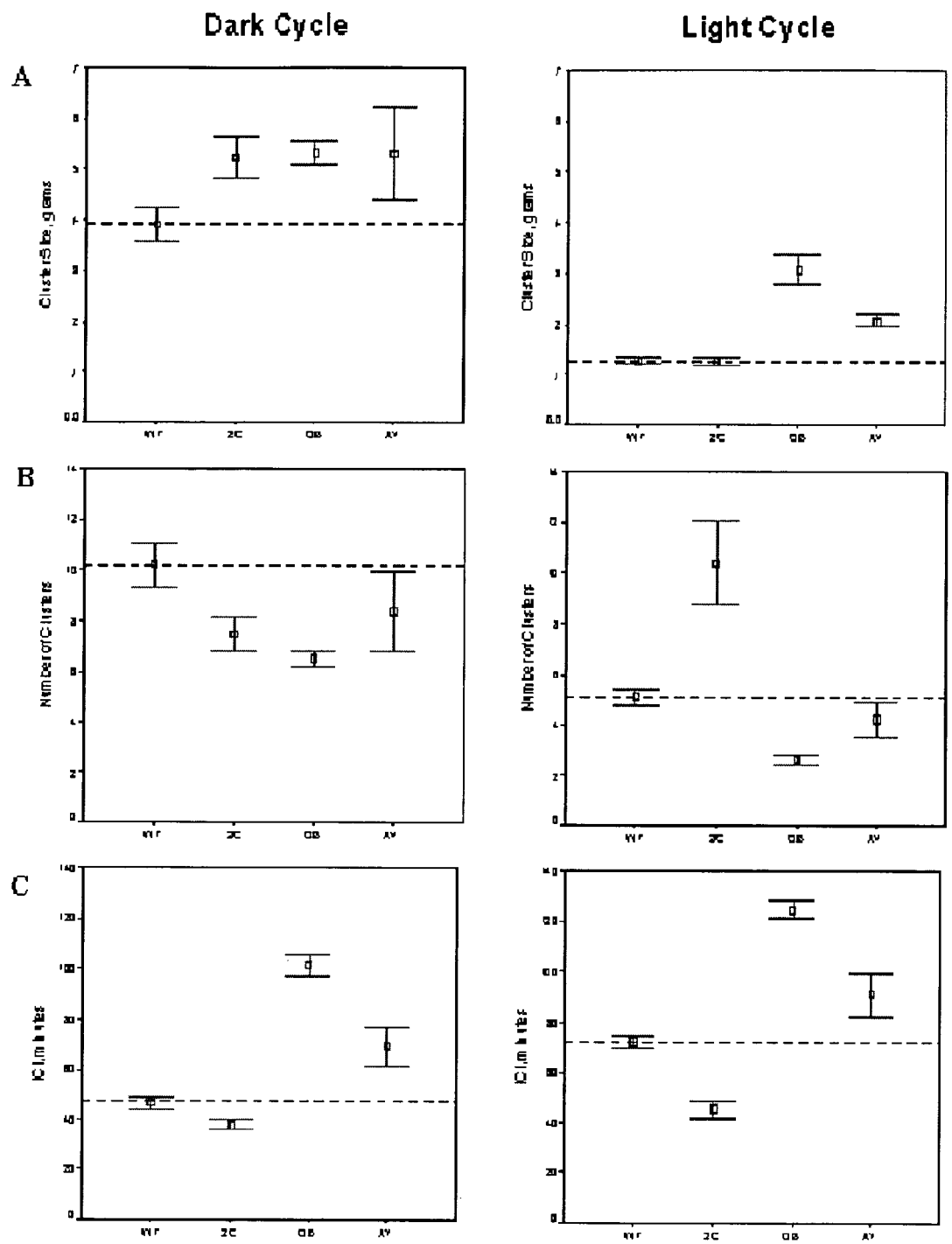
FIGS. 22A, 22B, and 22C shows cluster properties separated by cycle and genotype. Cluster properties were analyzed using T-tests to compare each mutant group with their respective wild type controls for each cycle.
Figure 23:
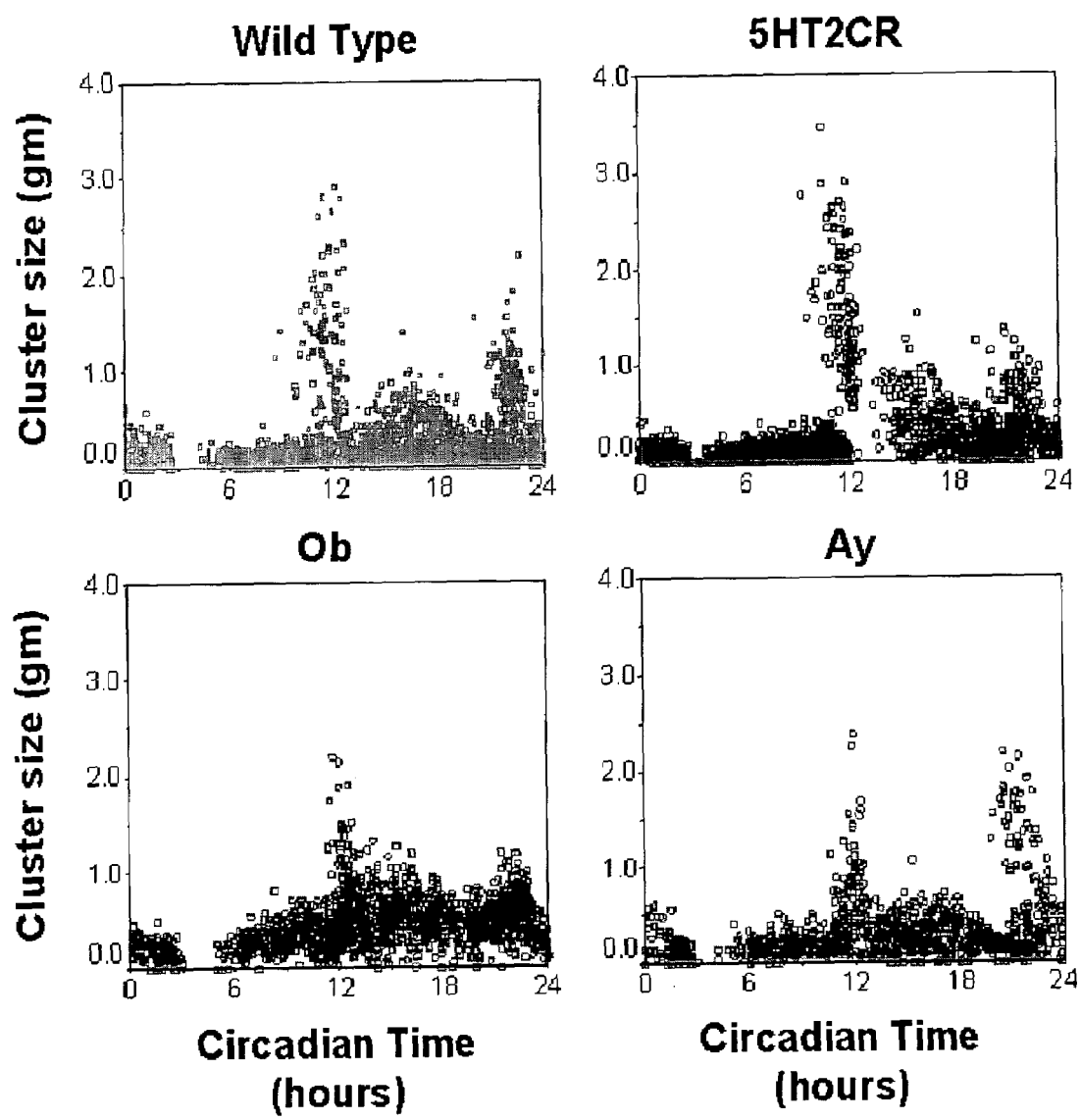
FIG. 23 shows cluster size measured in grams of food consumed in 6 minute bins across circadian time. The light cycle occurs between hours 0 to 12 and the dark cycle occurs between hours 12 and 24. Circadian rhythms in ingestive behavior can be seen by the variations in cluster sizes between the dark and light cycles and ultradian rhythms can be seen by the variations in cluster sizes in the dark cycle. Each red square represents a cluster of feeding.

In comparison with their respective wild type controls, the obese mutant mice all exhibit increased food consumption, thus it is expected that the properties of the clusters during which the mice are consuming food should change in such a way as to account for this increased consumption. Thus during the light cycle, the 2C mutants exhibit an increase in the number of feeding clusters accompanied by a corresponding decrease in the duration of the ICIs, but with no significant difference in the cluster size compared with their wild type controls (FIG. 22). In contrast, the Ob and the Ay mutants both show an increase in cluster size during the light cycle relative to their wild type controls. In addition, the Ob mutants also exhibit a decrease in the number of clusters accompanied by a corresponding increase in the duration of the ICIs. The Ay mutants show a similar trend of decreased cluster number and increased ICI duration relative to their controls but this does not reach significance. During the dark cycle, the Ob mutants again exhibit an increase in cluster size and a decrease in cluster number accompanied a increase in the duration of the ICIs. The Ay mutants show similar trends in the differences of their cluster properties relative to their WT controls however these do not reach significance. In contrast, during the dark cycle, the 2C mutants relative to their controls exhibit a somewhat distinct pattern of differences in their cluster properties in comparison with the light cycle differences. There is a significant decrease in the number of clusters but no significant change in cluster size or ICI duration. Examination of the circadian timing of certain cluster properties revealed that these properties are not constant across either the dark-light cycle nor within the dark cycle (FIG. 23). WT mice as well as 2C and Ay mutant mice exhibit increased cluster sizes at the onset and offset of the dark cycle Ob mutant mice however have less variation in cluster size within the dark cycle, seldom showing increased cluster sizes at the onset and offset of the dark cycle. All genotypes had relatively constant cluster sizes across the light cycle. Variations in cluster sizes within the dark cycle but not the light cycle may help explain why significant differences in cluster properties are more easily detected in the light cycle than the dark cycle.

Quantification of Circadian and Ultradian Rhythms of Feeding Behavior

The variation of cluster size within the dark cycle suggests that ultradian rhythms, periodicities shorter than 24 hours, are present in addition to circadian rhythms. Furthermore, it is apparent that differences in these circadian and ultradian rhythms are present across genotypes, making it important to quantify these periodicities allowing for comparisons between the genotypes.

Figure 24A:
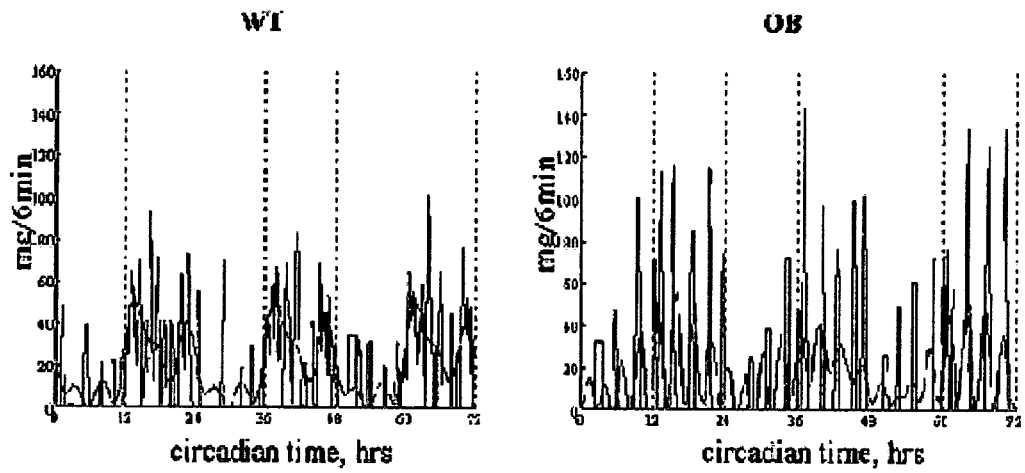
FIGS. 24A and 24B shows periodicities in feeding behavior of wild type versus Ob mutant mice.
Figure 24B:
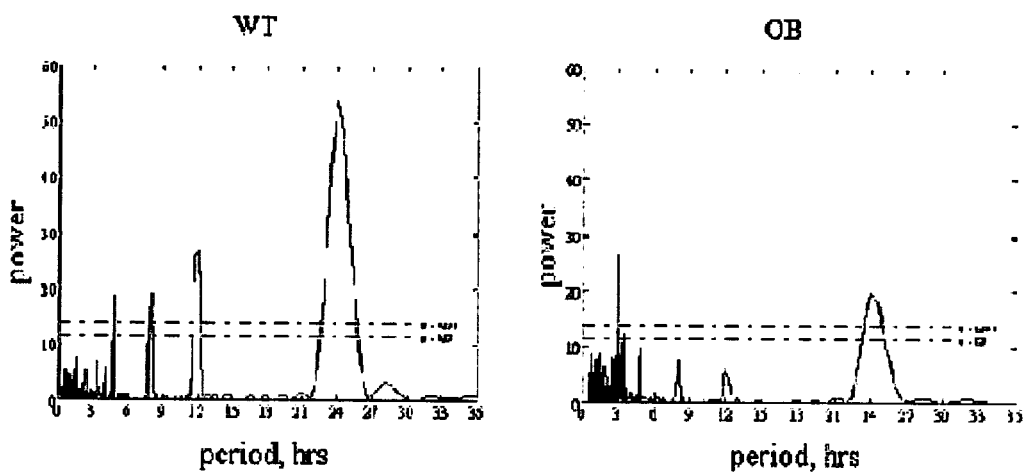

To quantify these periodicities, periodograms were generated from 10 days of data, and revealed significant peaks in amplitude not only at a period of 24 hours consistent with circadian rhythms but also at shorter durations consistent with ultradian rhythms in feeding (FIG. 24). Notably the WT mice frequently exhibit ultradian peaks at 12, 8 and 5 hours in addition to a prominent 24 hour peak while the Ob mutants have a less prominent 24 hour peak and exhibit fewer and shorter ultradian peaks. The significant periods were used to generate a waveform revealing that the onset and offset peaks in the WT appear to result from the combination of the 12, 8 and 5 hour peaks. Since these peaks are usually absent in the Ob mutants, the Ob mutants do not exhibit a strong onset-offset pattern of feeding and instead exhibt a more regular pattern of feeding at some interval dependent on the specific individual mouse.

Figure 25A:
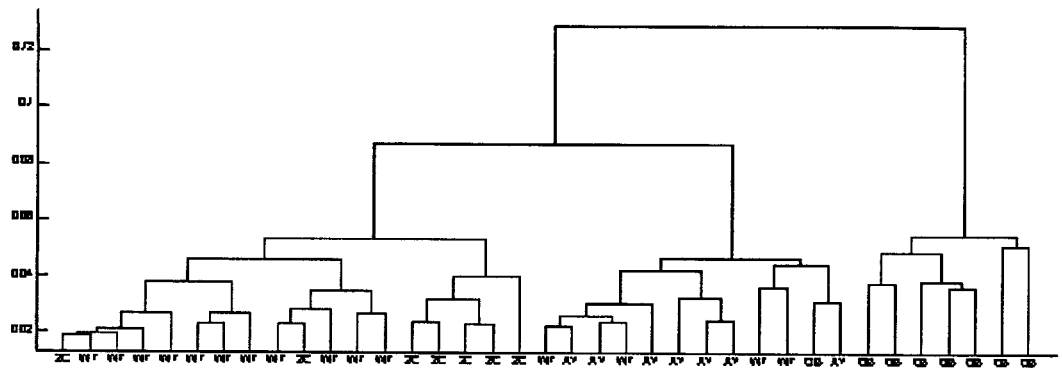
FIGS. 25A, 25B, and 25C show clustering based on periodograms and averaged waveforms generated from significant periods.
Figure 25B:
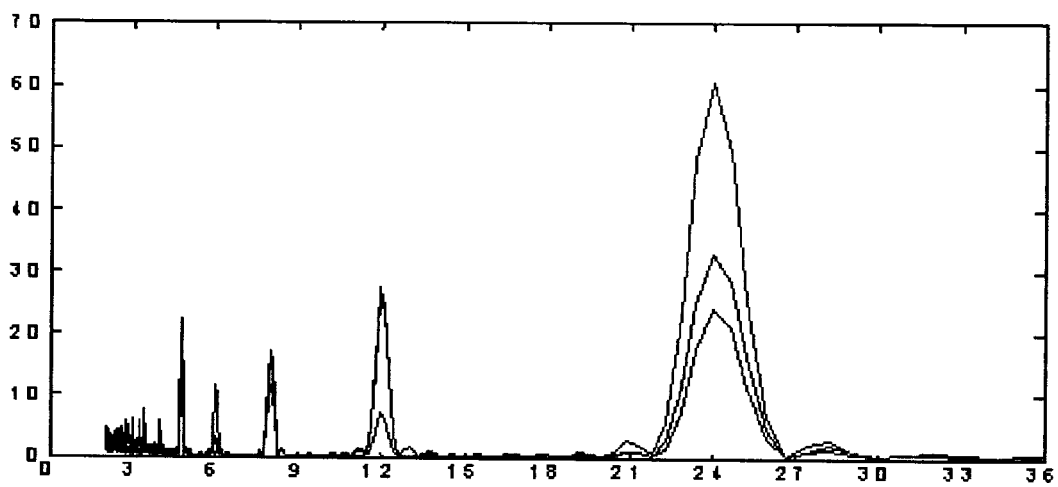
Figure 25C:
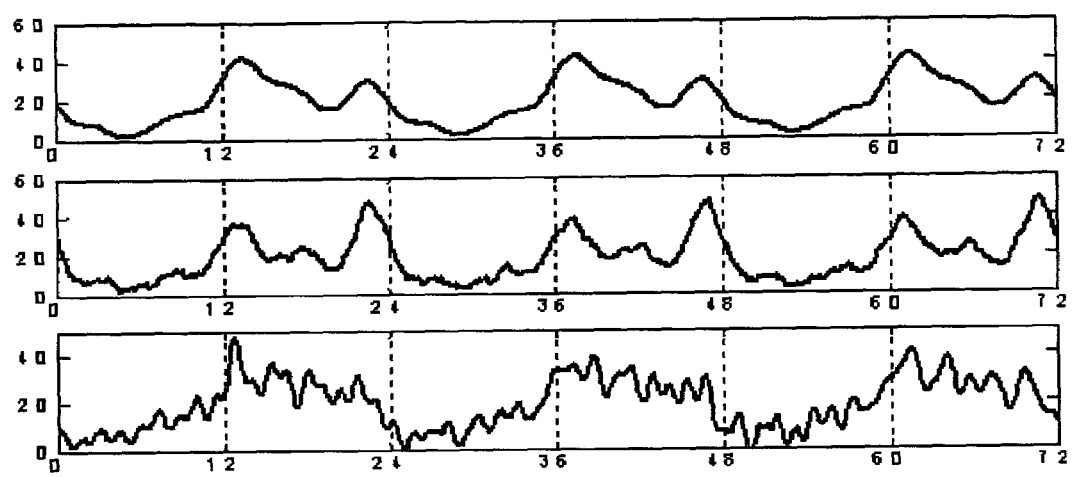

The periodograms were also used to cluster mice based on these patterns of feeding (FIG. 25). Three qualitative groups were seen, one with only WT mice and 2C mutants, one with mostly WT mice and Ay mutants, and one with only Ob mutants. The waveforms generated from the averaged periodograms showed three distinct patterns of feeding. The WT and 2C mice showed higher onset than offset peaks in feeding. The WT and Ay mice showed higher offset than onset peaks in feeding. In contrast, the Ob mice showed a more periodic pattern of feeding with no distinct onset and offset peaks in feeding. These averaged waveforms show a pattern or feeding that is consistent with the patterns of feeding that have been observed by examining the variations in cluster size with circadian time.

Discussion

The rationale for home cage behavioral monitoring stems from the hypothesis that behavior will be organized in time and space because such organization should improve the fitness of the animal. As a result, behavioral patterns, as with other phenotypes, will be genetically determined, and the description and quantification of these patterns should therefore lead to insights into the underlying function of the central nervous system structures regulating the production of these patterned behaviors. Here, data collection methods and analytical techniques for the quantification of behavioral patterns were developed and then tested by comparing animals with profound alterations in an important organizer of behavior, the maintenance of energy balance. Distinct alterations in patterns of ingestive behavior and physical activity were observed in mice having different mutations that result in obesity. These alterations can be understood in the context of genetic disruptions in a system attempting to maintain energy balance.

A relatively simple model of ingestive behavior has been developed. It was observed that all mice organize episodes of feeding, and likely of drinking and movement, into bouts. The bouts themselves are clustered together in time, and these clusters are separated by prolonged periods of inactivity at the nest. In addition, the cluster size varies not only with a circadian but also with ultradian rhythms. There is thus both a temporal and related spatial structure to the organization of the behavior of a mouse in its home cage.

The different mutant animals studied here exhibit distinct alterations in the underlying patterns that govern ingestive behavior. Thus, the 2C mutants were observed to have an increased number of clusters with a corresponding decrease in their ICI durations during the light cycle where they appear to be hyperphagic relative to their WT controls. However, the quantity of food that they consume during each cluster remains similar to that of their WT controls. This suggests that, during the light cycle, these mutant mice may a have disruption in systems regulating the initiation of clusters that results in clusters occurring more frequently with a shorter intervening interval. This might be interpreted as the result of an increased drive to consume food, but could also reflect disruptions of the sleep-wake cycle leading to increased arousal. This is interesting in light of the likely connection between the regulation of energy balance and arousal suggested by the discovery of the orexin neuropeptides, which have been discovered to regulate both food consumption and patterns of sleep and arousal (Mieda and Yanagisawa (2002) Current Opinion in Neurobiology 12: 339–345). It should be noted however that while the increased frequency of clusters points to an alteration in initiation of behavior, especially an increase in the initiation of feeding, there is no compensating decrease in the amount of food consumed in each cluster which would adjust the overall intake during the light cycle to a level consistent with the WT controls. This might be because the 2C mutants also exhibit increased activity during the light cycle and thus require increased food intake as a result of their increased energy expenditure. However, the 2C mutants are also hyperactive relative to their WT controls during the dark cycle but do not exhibit increased intake during the dark cycle. This suggests that the effects of this mutation on food intake are dependent on the time point during the light-dark cycle and argues against a tight correlation between food intake and activity that would account for the increased energy intake observed in these mice. It may be that there are distinct metabolic processes that are selectively altered during the light cycle in these mice that lead to the eventual development of a mild obesity later in the life of these animals. Consistent with this, it is known that there are numerous alterations in the transcriptome of an animal across the light-dark cycle in organs, such as the liver, that play a major role in metabolic regulation (Akhtar et al. (2002) Current Biology 12: 540–550). In addition, it is also known that the 2C mutants display an age-related decrease in the cost of locomotion that is more marked WT mice and likely contributes to the development of obesity in the 2C mutants (Nonogaki et al. 2003). It would therefore likely be highly informative to examine how the patterns of ingestion and activity change in the 2C mutants with age.

In contrast to the 2C mutants, the OB mutants exhibit a very distinct pattern of intake and activity relative to their WT controls. Both during the light and dark cycle, the OB mutants exhibit an increase in the quantity of food consumed during a cluster accompanied by a decrease in the number of clusters and a corresponding increase in the ICIs. It may therefore be the case that the OB mutants have an impairment of the system that regulates the termination of food intake. However, even though the frequency of their intake is decreased which would serve to decrease total intake, it is not sufficient to compensate for the increase in consumption during a cluster, indicating that the mechanisms regulating the initiation of intake are also not functioning normally in this animal. Given the role of leptin in acting as a signal of adipose depot status, the concurrent alterations in the initiation and termination of intake may represent an appropriate CNS response attempting to increase energy intake. This is consistent with the profound hypoactivity observed in these animals as well as the numerous other metabolic and neuroendocrine alterations that they exhibit that seem to indicate a response to starvation (Ahima et al. (1996) Nature 382: 250–252). Such a response to conserve energy however stands in distinct contrast to the patterns exhibited by the 2C mutants, who also develop obesity although later and of a much less pronounced degree. In addition, the OB mutants have another distinct alteration in their pattern of behavior that is not observed in either the 2C or the AY mutants, which is an alteration in both their pattern of circadian and ultradian rhythms. The OB mice have a less pronounced circadian rhythm, and in addition, do not exhibit the ultradian rhythms that give rise to the marked onset and offset peaks of feeding at the beginning and end of the dark cycle observed in the WT, 2C, and AY mice. Instead, the OB mutants tend to have a single shorter ultradian rhythm that give rise to a more regular periodic feeding pattern. One possible explanation for this pattern is that factors controlling energy balance dominate the regulation of the temporal patterns of activity and ingestion in the OB mutants overriding signals underlying the ultradian and circadian rhythms. The dampened circadian rhythm may reflect a decrease in responding to signals from the animal's internal circadian clock such as that located in the suprachiasmatic nucleus. The source of the signals generating the ultradian rhythms is not known but may also be overridden. Alternatively, it may be that the OB mutation is directly involved in altering the signals producing these periodicities.

Finally, the AY mutants also exhibit distinct changes in their patterns of behaviors relative to their WT controls. These appear distinct from the patterns observed in the 2C and OB mice, although the AY mutants have some features of their behavioral pattern that are more similar to the OB than the 2C mutants. During the light cycle, the AY mutants have an increase in the amount of food consumed during a cluster that may account for their increased intake. However, no significant changes in cluster properties were observed during the dark cycle in the AY mutants although they appear to be as hyperphagic during the dark and light cycle compared to their WT controls. This lack of a detectable change in pattern during the dark cycle may be the result of the marked ultradian rhythms (presence of onset and offset feeding peaks) present in both the WT and AY mice which makes comparison of cluster size across the dark cycle less meaningful. The presence of these onset-offset peaks in feeding during the dark cycle also seems to distinguish the AY pattern of ingestion from the OB pattern of ingestion.

In fact, differences in the periodograms between mice that reflect these ultradian and circadian rhythms can be used to qualitatively group animals based on their periodicities of ingestive behavior. This reveals that the WT mice seem to be split into two groups: one with a more prominent onset feeding peak and another with a more prominent offset feeding peak occurring during the dark cycle. The 2C mutants appear to fall into this first group while the AY mutants fall into the second group, and for the most part the OB mutants fall into a third group which lacks clear onset and offset feeding peaks during the dark cycle. It should also be noted that the underlying cause of these onset and offset peaks appears to be the occurrence of long duration clusters that occur at the beginning and end of the dark cycle.

In summary, a descriptive quantitative model of the home cage behavior of mice has begun to be developed. The properties of this model vary and exhibit distinct patterns as a result of different mutations producing obesity suggesting these mutations affect different systems regulating energy balance. In addition, these results indicate that it is possible to detect changes in the behavioral patterns of a freely behaving animal as it organizes its behavior in response to internal and external cues. The goal of such a description of behavioral patterns is to produce a model that reflects the structure of the data, which in this case is the continuous stream of behavior exhibited by an animal.

In turn, the model hopefully reflects the structure of the generating process, here, the central nervous system. A compact model of behavioral data, such as the data collected and examined in this study, should allow us to learn about the functioning of the central nervous system and the underlying genetic contribution to its structure as well as to make predictions from the model that will be consistent with new samples.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. An animal behavior analysis system, said system comprising:
    an enclosure, said enclosure comprising:
        an animal position indicator comprising a two-dimensional force plate;
        a food consumption indicator comprising a photobeam and an overflow; and
        a fluid consumption indicator comprising a capacitance indicator;
    wherein said system reports behavioral data at a temporal resolution of 20 seconds or lower.

2. The system of claim 1, wherein said system reports behavioral data with a temporal resolution of 1 second or lower.

3. The system of claim 1, wherein said system reports behavioral data with a temporal resolution of 50 ms or lower.

4. The system of claim 1, wherein said enclosure is a mouse cage.

5. The system of claim 1, wherein said system reports behavioral data with a temporal resolution sufficient to permit automated bout detection of a mouse.

6. The system of claim 1, wherein said force plate comprises high and low frequency transducers.

7. The system of claim 1, wherein said food consumption indicator comprises an overflow to prevent piled up food from producing a false positive signal.

8. The system of claim 1, wherein said capacitance detector operates in a radio frequency range.

9. The system of claim 1, further comprising a data acquisition system.

10. The system of claim 9, wherein said data acquisition system produces an event file.

11. The system of claim 10, wherein the event file produced by said system provides event information at sufficient resolution to distinguish behavioral bouts of mice using a mathematical method.

12. The system of claim 11, wherein said mathematical method comprises a frequency analysis.

13. A method of characterizing the behavior of an animal, said method comprising:
    providing an animal in an animal behavior analysis system of claim 1; and
    collecting data produced by said system wherein data provided by said system comprises event information regarding spatial position of the animal in the enclosure, event information regarding food consumption, and event information regarding fluid consumption.

14. The method of claim 13, wherein said animal is a mouse.

15. The method of claim 13, wherein said method further comprises analyzing said data to provide a behavioral fingerprint of said animal.

16. The method of claim 15, wherein said analyzing comprises automated detection of one or more behavioral bouts.

17. The method of claim 15, wherein said behavioral fingerprint is characteristic for a particular genetic strain of said animal.

18. The method of claim 15, further comprising entering said fingerprint into a database of behavioral fingerprints.

19. The method of claim 13, wherein said data is provided in an event file.

20. The method of claim 13, further comprising taking a moving average of said event data.

21. The method of claim 13, further comprising performing a frequency analysis of said event data.

22. A method of screening an agent for an effect on animal behavior, said method comprising:
    contacting a test animal with said agent;
    placing said animal in an animal behavior analysis system of claim 1 to generate a behavioral fingerprint;
    and comparing said fingerprint to a negative control fingerprint where a deviation of said fingerprint from said negative fingerprint control indicates that said agent alters said animal's behavior.

23. The method of claim 22, wherein said agent is a substance of abuse.

24. The method of claim 22, wherein said agent is a pharmaceutical.

25. The method of claim 22, wherein said animal is a mouse.

26. The method of claim 22, wherein said animal is a mutant mouse.

* * * * *